United States Patent [19]

Fisher et al.

[11] Patent Number: 4,670,626

[45] Date of Patent: Jun. 2, 1987

[54] CROSS CONNECT FRAME FOR DIGITAL SIGNALS

[75] Inventors: Thomas M. Fisher, Plano; David J. Gehalo, Richardson, both of Tex.

[73] Assignee: Reliance Comm/Tec Corporation, Chicago, Ill.

[21] Appl. No.: 821,078

[22] Filed: Jan. 21, 1986

[51] Int. Cl.4 .............................................. H04L 11/04
[52] U.S. Cl. ...................................... 178/1; 178/2 R; 178/74; 370/58; 379/326
[58] Field of Search .......................... 178/1, 2 R, 3, 74; 179/98; 370/58; 361/380, 428, 429

[56] References Cited

U.S. PATENT DOCUMENTS 3,562,435  2/1971  Joel .................................. 179/98 X Primary Examiner—Stafford D. Schreyer
Attorney, Agent, or Firm—Michael M. Rickin

[57] ABSTRACT

A cross-connect frame for digital signals transmitted at DS-1 and higher rates independent of signal format is disclosed. In its simplest form the frame includes a single chassis into which boards providing for either a mechanical or electronically controllable connection may be inserted. In either the mechanical or electronic form provisions for monitoring and patching are included. Multiple chassis may be connected together and in the electronic form a single circuit has the capability of controlling a multiplicity of chassis.

26 Claims, 11 Drawing Figures (1 OF N)

CROSS CONNECT FRAME FOR DIGITAL SIGNALS

BACKGROUND OF THE INVENTION

1. Field of the Invention

This invention relates to a cross connect frame for digital signals (hereinafter referred to as a "DSX") and more particularly to a DSX which allows enhanced electronic features to be combined with traditional electromechanical features in a unit which takes up no more floor space than one with only the traditional features.

2. Description of the Prior Art

The DSX, as specified in the Compatability Bulletin No. 119 of the American Telegraph and Telephone Co., is that intermediate terminating point where DS-1 equipment such as multiplexers, channel banks, switches and transmission facilities can be interconnected. In the electromechanical form in which the DSX is presently embodied in the prior art it typically consists of a steel frame upon which is mounted two sets of terminal blocks. The transmission facilities, i.e., the digital transmission lines entering the office where the DSX is located and the digital equipment in that office, are connected to one of the sets of blocks and that set and its blocks will be referred to as the "line" and "equipment" blocks, as the case may be. The other set is used for the cross connection and its blocks will be referred to as the "cross-connect" blocks. The electromechanical DSX is generally used to perform the cross connection between the line and equipment facilities.

Also mounted on the electromechanical DSX steel frame is a jackfield. The jacks are wired such that they can be used either for test access or for temporarily effecting a cross-connection also known as "patching". Patching is possible even if there is a previously wired cross-connection as the insertion of a plug in a jack causes a set of contacts to open to thereby break the connection between the equipment and cross-connect blocks. Insertion of the plug into a jack also connects the tip and ring conductors of the plug to the corresponding leads on the equipment block to which the jack is wired. If the plug should be part of a cable or patch cord assembly which has a like plug on the other end, then the insertion of the other plug into another jack also connects the tip and ring conductors of the plug to the leads on the equipment block to which that jack is wired. The insertion of the plugs into the jacks breaks any previously wired connection between the equipment and cross-connect blocks. The patch cord then connects the equipment leads to each other thereby by passing any previously wired connection.

Since the DSX is used to connect digital facilities which are operating at data rates in excess of one megabit per second (Mbps), they are specially constructed to minimize crosstalk. Aside from that, the electromechanical prior art DSX functions the same as the well known voice frequency main or intermediate distribution frames in a central office. As in those frames, the equipment and cross-connect blocks of a DSX are hardwired to each other in a predetermined manner so as to accomplish the desired routing for the DS-1 digitial signals. Characteristic of all electromechanical distribution frames whether of the main, intermediate or DSX type, is that all reconfiguration, i.e., changing of the cross-connections, circuit monitoring and testing must be performed manually.

It is, however, desirable that an electromechanical DSX be upgradeable to an electronic DSX. It is also extremely desirable that the upgradeability be capable of being accomplished in a manner such that the electromechanical interconnections can be directly replaced by circuit boards which allow for electronic interconnections. It is also further extremely desirable that this replacement be accomplished in a manner such that the electronic DSX takes up no more floor space than the electromechanical DSX it is replacing. It is also further extremely desirable that the electronic DSX be remotely controllable such that a user can originally configure and change cross-connections, monitor and test by use of a display terminal and keyboard. It is also desirable that the electronic DSX include a jackfield such that the user can patch cross-connections as desired.

SUMMARY OF THE INVENTION

A cross-connect frame for digital signals of the DS-1 type. The frame is capable of having connected to it first and second groups of N digital transmission lines each.

The present invention is embodied by a frame which is made up of a first multiplicity of terminals to which the first group of N lines are individually connectable to selected ones of those terminals, a second multiplicity of terminals and a third multiplicity of terminals to which the second group of N lines are individually connectable to selected ones of those terminals. A removable circuit board means is in electrical contact with the first and second multiplicity of terminals. The board means has a circuit which is arrangeable to provide a connection between selected ones of the first and second multiplicity of terminals so that any one of the first group of lines can appear at selected ones of the second terminals. The second and third multiplicity of terminals are sufficient in number to allow any one of the second group of lines to be connected to any one of the first group of lines.

The present invention is also embodied by a frame which is made up of electronically controllable switching means and electronic control means connected thereto. The switching means responds to a command signal to connect or disconnect a selected line of the first group with or from a selected line of the second group. The electronic control means includes an interface which has an input to receive a signal which designates the lines to be connected or disconnected and a command indicating connection or disconnection and an output for transmitting the command signal to the switching means. The control means also includes a processing means which receives the signal from the input and provides in response thereto the command signal.

DESCRIPTION OF THE PREFERRED EMBODIMENT

Figure 1:
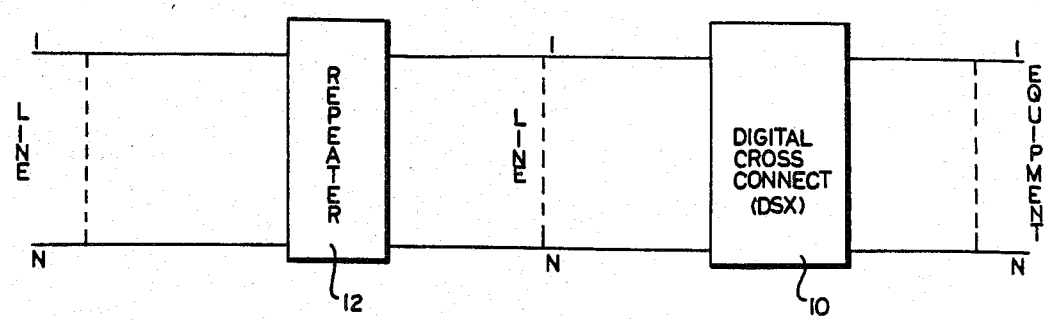
FIG. 1 is a block diagram of a DSX as it would be located in a typical central office.

Referring now to FIG. 1, there is shown a block diagram of a DSX 10 as it would be located in a typical central office (C.O.). The office generally has coming into it a number of digital transmission lines. It may be desired to cross-connect by use of DSX 10 up to N of those incoming lines with the digital equipment such as switches, channel banks, etc. typically located at the office. DSX 10 is then typically connected between the office digital repeater 12 and the other equipment (not shown). The N digital transmission lines to be cross-connected appear in this block diagram representation at the left-hand side of DSX 10. That side bears the designation "Line" and those transmission lines will be referred to hereinafter as the "Line Side". The N lines to which they are to be connected appear in this block diagram representation on the right side of DSX 10. That side bears the designation "Equipment" and those transmission lines will be referred to hereinafter as the "Equipment Side". DSX 10 provides the means by which the N lines of the Line Side can be cross-connected as desired with the N lines of the Equipment Side.

Figure 2A:
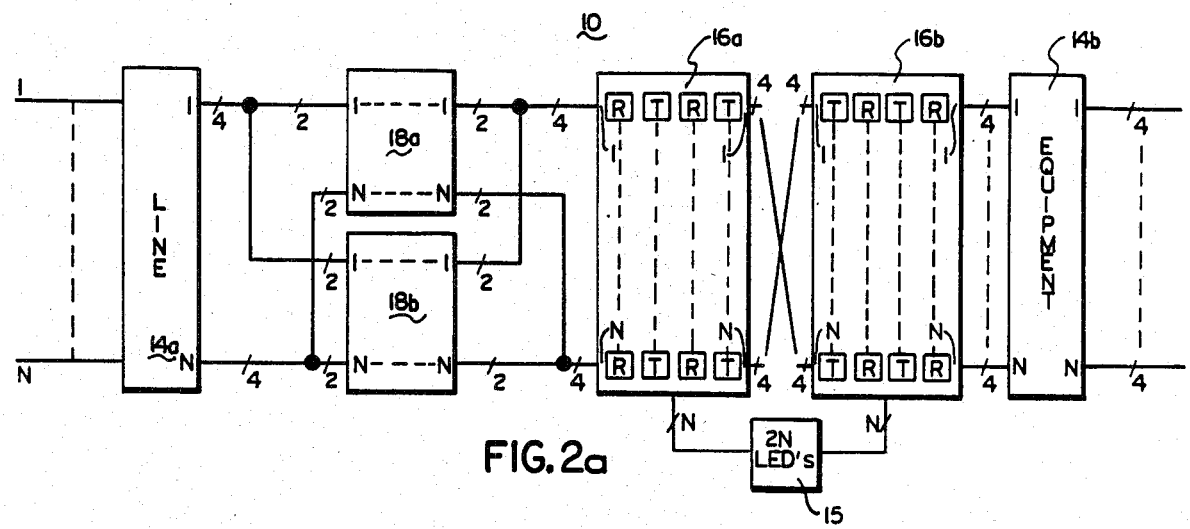
FIG. 2a is a simplified block diagram of the electromechanical form of the DSX of the present invention as embodied in a single chassis.

Referring now to FIG. 2a, there is shown by a simplified block diagram the electromechanical form of the DSX 10 of the present invention as it is embodied in a single chassis. The incoming N Line Side digital transmission lines are connected to terminal block 14a. The N Equipment Side digital transmission lines from the office equipment are connected to terminal block 14b. The digital transmission lines have four wires for each line and therefore blocks 14a and 14b must each have at least 4N sets of connection terminals to accommodate the N lines connected to them. For ease of illustration, the terminals on blocks 14a, 14b are not shown in FIG. 2a.

DSX 10 also includes cross-connect blocks 16a, 16b. It is at these blocks that the desired cross-connection between the "Line Side" and "Equipment Side" digital transmission lines will be established. Each of blocks 16a, 16b must have 4N connection terminals to allow for that cross-connection. As described above and as is well known, each digital transmission line has four wires (two pair), the two wires of each pair being designated as tip (T) and ring (R). The four connection terminals, 16c, d, e, f, on each of blocks 16a, 16b associated with each of the N lines are designated as T, R, T, R, respectively. For ease of illustration, only the connection terminals 16c, d, e, f associated with lines 1 and N have been shown in FIG. 2a.

With regard to effectuating the cross-connection, jumpers are placed between the four connection terminals associated with one of the Line Side lines appearing at block 16a and the four connection terminals associated with one of the Equipment Side lines appearing at block 16b. For example, it may be desired to cross-connect line 1 at block 16a with line 1 at block 16b or with any other of the N lines present at block 16b. In order to avoid needlessly cluttering FIG. 2a, the cross-connection of the N lines of block 16a with the N lines of block 16b is shown symbolically by an "X". The connection terminals on each of blocks 16a, 16b may be of any type well known in the art such as the wirewrap type. It should be appreciated that as a result of the cross-connection the N Equipment Side lines in effect appear at block 16a. The order in which they appear is determined by the cross-connecting that have been made.

In order for DSX 10 to make a complete cross-connection between the Line Side and Equipment Side digital transmission lines it is necessary for blocks 14a and 14b to be connected to block 16a. In the electromechanical form of the DSX of the present invention those interconnections are accomplished by the use of circuit boards, also known as strapping boards, which are shown in FIG. 2a as blocks 18a, 18b. These boards provide a straightthrough connection for the N Line Side lines at blocks 14a and 14b to block 16a. Two such strapping boards are used as each board connects only one of the two pair of wires associated with each Line Side digital transmission line to block 16a.

Figure 2B:
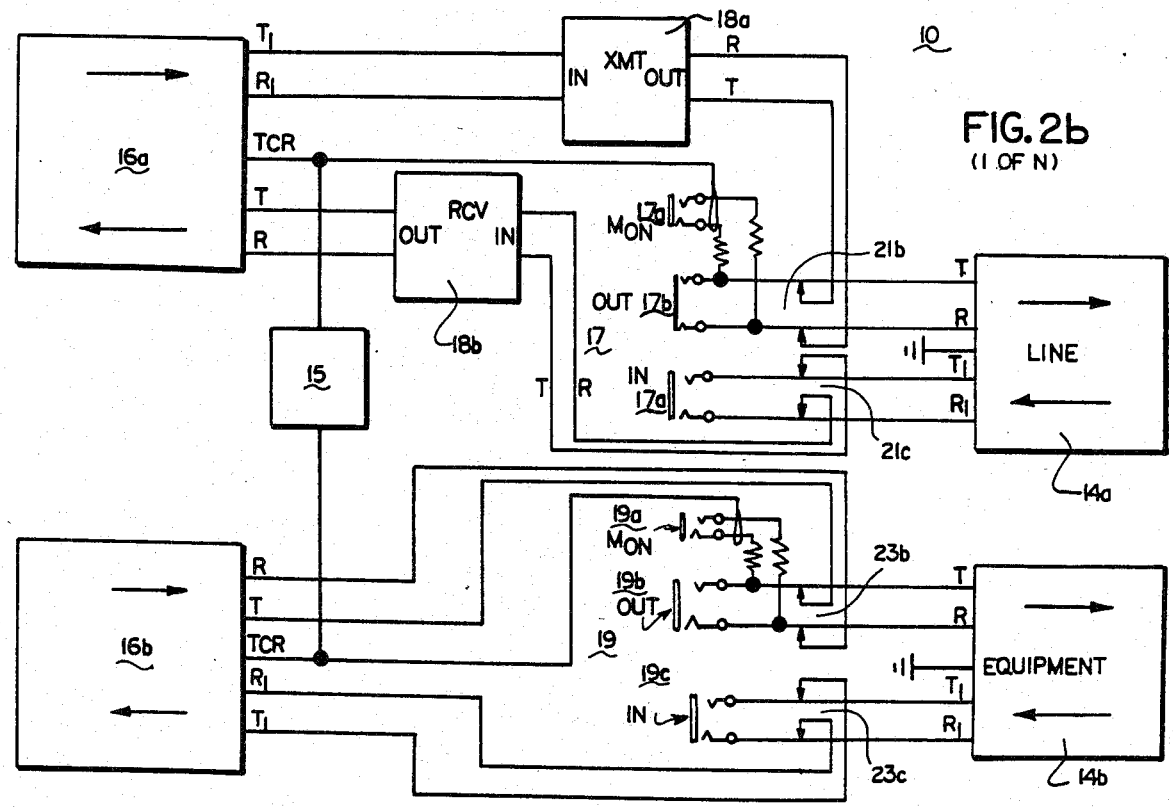
FIG. 2b shows the block diagram of FIG. 2a for only one Line Side and Equipment Side digital transmission line.

DSX 10 also includes two groups of jacks 17, 19 which are shown in FIG. 2b. In order to illustrate the jacks 17, 19 and further describe their function it is only necessary to show the jacks associated with one of the Line Side and one of the Equipment Side digital transmission lines. Such an illustration is shown in FIG. 2b which shows not only the jacks but also the blocks 14a, b; 16a, b and 18a, b redrawn for only one such Line Side and Equipment Side line. One group of jacks 17 is associated with the Line Side digital transmission lines whereas the other group of jacks 19 is associated with the Equipment Side digital transmission lines. Each group has in it three rows of jacks with the number of jacks in each row being equal to the number of lines (N) served by DSX 10. The three rows of group 17 are designated herein as 17a, 17b and 17c while the three rows of group 19 are designated herein as 19a, 19b and 19c.

As described above, the Line Side and Equipment Side digital lines each have two pairs of wires. Jacks 17b and 17c are each associated with one of the two pairs of wires of each Line Side digital line. Jack 17b is connected by appropriate contacts 21b to one of the two pairs of wires which are connected to strapping board 18a. Jack 17c is connected by appropriate contacts 21c to the other of the two pairs of wires which are connected to strapping board 18b. Therefore, as both boards 18a and 18b are connected to block 16a, the jacks are also associated with block 16a. Jacks 19b and 19c are each associated with one of the two pairs of wires of each Equipment Side digital line. The jacks are connected by appropriate contacts 23b, 23c, respectively, to those pairs of wires and by them to block 16b.

The jacks 17b, 17c, 19b, 19c allow for the insertion of a plug to thereby effect a temporary cross-connection between one of the Line Side and one of the Equipment Side digital lines. Insertion of the plug into one pair of the jacks 17b, 17c associated with the Line Side line to be patched breaks the associated contacts 21b, 21c and thereby disconnects that line from boards 18a, 18b and therefore from block 16a. Insertion of the plug into one pair of the jacks 19b, 19c associated with the Equipment Side line to be patched breaks the associated contacts 23b, 23c to thereby disconnect that line from block 16b. Therefore, insertion of the plug allows for a temporary cross-connection which overrides the cross-connection for those lines which may have been effected through blocks 16a, 16b.

Jacks 17a and 19a allow for the monitoring of the digital signals in the Line Side and Equipment Side transmission lines, respectively. To accomplish that result jack 17a is connected to jack 17b and jack 19a is connected to jack 19b. Insertion of a plug into jack 17a allows the digital signal present on the pair of wires connected to jack 17b to be monitored. Insertion of a plug into jack 19a allows the digital signal present on the pair of wires connected to jack 19b to be monitored. To insure complete monitoring of both the Line Side and Equipment Side digital signals, jacks 17b, 19b are connected to the pair of wires on each side on which digital signals exit that side to the Line or Equipment as the case may be.

DSX 10 also includes another circuit board 15 which contains on it only light emitting diodes (LED's) when the DSX is embodied in its electromechanical form. As shown in FIG. 2a, the LED only board 15 is connected between block 16a and 16b. As shown in FIG. 2b, the LED only board 15 is also connected to monitor jacks 17a and 19a and therefore provides a visual indication of the insertion of a plug into a monitor jack. There are two N LED's on board 15 of DSX 10. For ease of determining which line is being monitored the LED's may be arranged in two rows of N LED's each and in a manner such that when board 15 is inserted in DSX 10 the LED's line up with the associated jacks of groups 17, 19.

When DSX 10 is embodied in the form of a single chassis its upgrading from an electromechanical DSX to an electronic DSX is accomplished by replacing the LED only board 15 and strapping boards 18a, 18b by circuit boards which allow for the desired electronic interconnection of Line Side and Equipment Side digital transmission lines. As described in more detail hereinafter, when DSX 10 is made up of multiple chassis it is not necessary in every chassis to replace LED only board 15 by an electronic circuit board. Therefore, the purely electromechanical DSX 10 of FIGS. 2a and 2b has been designed to be easily upgradeable to a purely electronic DSX which will be described in more detail hereinafter.

Figure 3A:
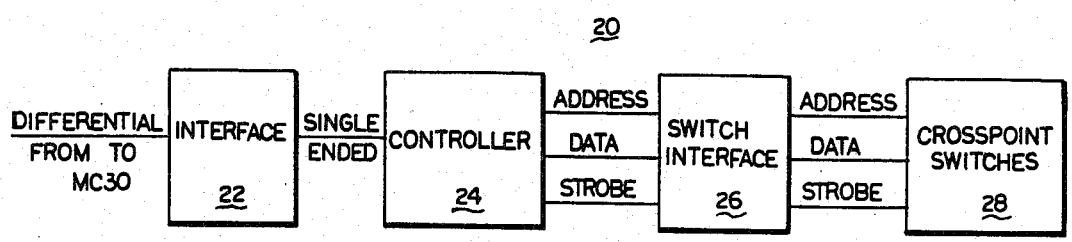
FIG. 3a shows in block diagram form the switch unit of the electronic form of the DSX of the present invention.

Referring now to FIG. 3a there is shown in block diagram form that portion of the electronic DSX 10 of the present invention which replaces the strapping boards 18a, 18b of the electromechanical DSX shown in FIGS. 2a and 2b. As boards 18a, 18b have been replaced by two identical electronic circuit boards, only one need be shown and described in detail. The electronic replacement for the strapping boards will be referred to hereinafter as a switch unit control (SU) 20.

Figure 3B:
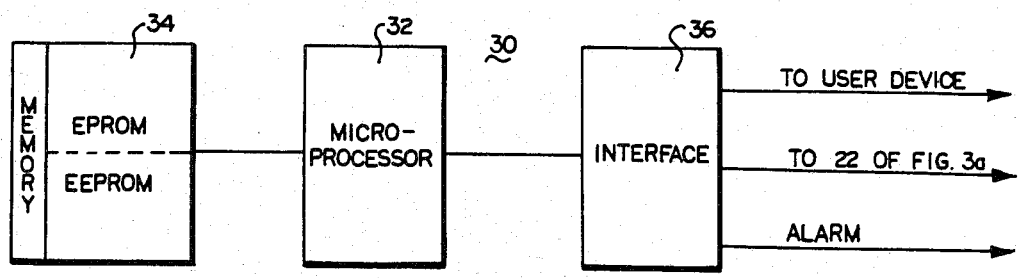
FIG. 3b shows in block diagram form the master controller of the electronic form of the DSX.

SU 20 includes an interface 22 which is used to interface with a master controller (MC) 30 which is shown in FIG. 3b and will be described in more detail hereinafter. The master controller, which in the single chassis embodiment of DSX 10 replaces LED only board 15, provides the commands to connect and disconnect a designated one of the Line Side digital transmission lines to a designated one of the Equipment Side digital transmission lines. Those commands are received by SU 20 in the form of differential signals and interface 22 converts those signals into the single-ended signals used in SU 20. Interface 22 also converts single-ended data to be transmitted to the master controller to differential signals.

SU 20 further includes a controller 24 which is connected to interface 22 to receive the single-ended signals therefrom and transmit single-ended signals thereto. Controller 24 provides in response to the connect and disconnect commands from the master controller the signals through interface 26 to the crosspoint switches 28 to either make or break the connection.

As will be described in more detail hereinafter in response to a connect or disconnect command, controller 24 generates the X and Y address of the particular one of the switches associated with the lines to be connected or disconnected, a data bit indicating the command, i.e. connect or disconnect, and a strobe pulse. All of the crosspoint switches 28 receive the X and Y address and the data bit simultaneously. The strobe pulse is sent only to the crosspoint switch which must be either closed or opened in order to execute the connect or disconnect command.

Referring now to FIG. 3b there is shown in block diagram form that portion of the electronic DSX 10 of the present invention which has replaced the LED only indicating board 15 of the electromechanical DSX. This portion will be referred to hereinafter as the master controller (MC) 30. While MC 30 includes the various electronic circuits to be described below, it also includes the two N LED's previously included in the electromechanical version of DSX 10 described above. The upgrading of DSX 10 from a purely electromechanical unit to an electronic unit does not result in removal of jacks 17, 19. They remain and still function in the electronic DSX in exactly the same manner as they do in the electromechanical DSX. Therefore, the jacks allow for patching and monitoring as described above. Thus, the 2N LED's in electronic DSX 10 still provide a visual indication of which line is being monitored.

MC 30 includes a microprocessor 32, a memory 34 and an interface circuit 36. The memory 34, which is made up of both EPROM and EEPROM, includes in its EPROM portion the program to run the microprocessor 32 and in its EEPROM portion at least a table of the electronic cross-connections that have already been made in response to previous connect commands. The EEPROM may also include other information such as passwords, call back numbers, etc. The memory also includes a RAM which is used for temporary storage. The interface 36 allows the microprocessor to receive commands from the user of the DSX. Those commands can be entered through a user terminal or other suitable means. The interface 36 also includes the means by which differential signals are transmitted and received from interface 22 of SU 20.

While not shown in FIGS. 3a and 3b, both SU 20 and MC 30 may also include a "watchdog" circuit in order to monitor the microcomputer and microprocessor contained therein. As is well known in the art, the watchdog circuit may monitor the micro device by generating and counting its own pulses and causing an appropriate alarm to be generated if the count reaches some predetermined number before a reset pulse is received from the micro device. The alarm indicates a failure of the micro device.

Figure 4A:
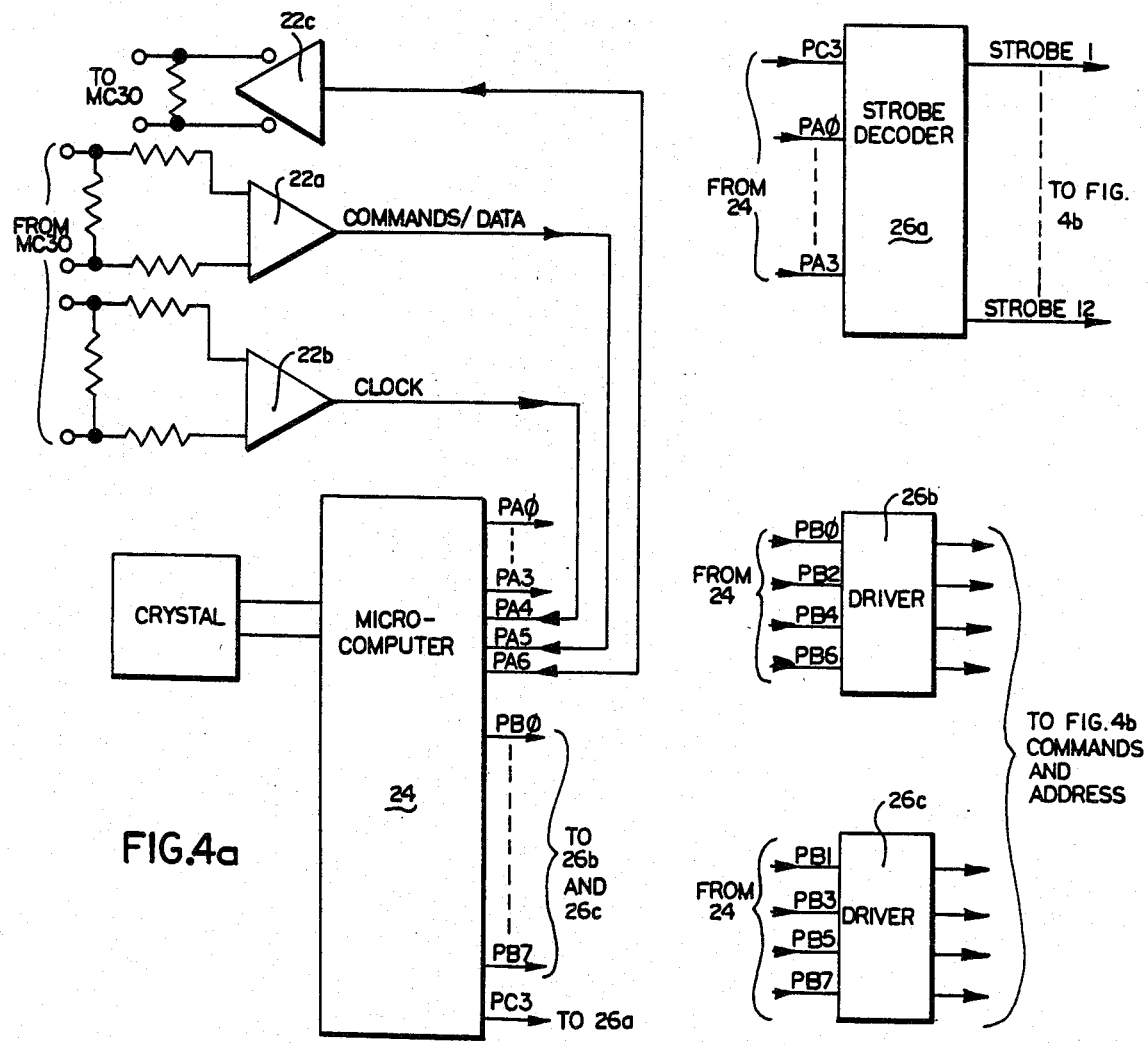
FIG. 4a shows a detailed block schematic diagram for part of the switch unit.

Referring now to FIG. 4a there is shown a detailed circuit schematic block diagram for interface 22, controller 24, and switch interface 26 of SU 20. Interface 22 includes two receivers, 22a and 22b, which are used to receive the commands and data, and the clock transmitted to the SU 20 from MC 30. Interface 22 also includes a transmitter 22c which is used to transmit data back to MC 30.

The receivers 22a, 22b convert the differential signals received from the MC 30 into single ended signals which are connected to controller 24. Transmitter 22c converts the single-ended signals from controller 24 to differential signals for transmission to MC 30.

Controller 24 is in the form of a microcomputer which may, for example, be implemented by a 6805 chip available from Motorola Corp. For ease of illustration and description it will be assumed that the controller is so implemented and the pin numbers and designators shown in FIG. 4a are those associated with that chip.

When the user of DSX 10 wishes to electronically connect or disconnect one of the line digital transmission lines to one of the equipment transmission lines the user enters an appropriate command to the MC 30. The form of that command and the response of MC 30 thereto will be described in more detail hereinafter. For purposes of this description let it be assumed that the lines desired to be connected or disconnected are not already so connected or disconnected. Controller 24 receives from interface 22 data which represents the command to be executed (connect or disconnect) and the lines to be so connected or disconnected.

The microcomputer is programmed to generate in response to the command either a "1" or a "0" which indicates either connect or disconnect, respectively. The microcomputer is also programmed to take the data received about the specific lines to be connected or disconnected and translate that data into a form appropriate for transmission to crosspoint switches 28. As will be described in more detail hereinafter with respect to FIG. 4b, the crosspoint switches 28 are arranged in an array with all of the line and equipment digital transmission lines connected thereto in a known manner. The microcomputer must provide the address of the location in the crosspoint switch array where the lines to be connected or disconnected are located. It must also cause a strobe pulse to be transmitted only to that one of the crosspoint switches where the lines are located. The microcomputer must also perform other functions which will be described in more detail hereinafter.

Interface 26 includes a decoder 26a which responds to signals from the microcomputer to thereby generate the appropriate strobe signal. As will be described in connection with FIG. 4b, the crosspoint switches 28 are arranged in a 4×3 array. Each unit in the array receives a unique strobe signal. Therefore, decoder 26a must generate 12 unique strobes when the switches are arranged in the 4×3 array.

Decoder 26a receives at its input address signals from the microcomputer which indicate which one of the twelve strobe signals are to be generated. Decoder 26a provides at its output the selected strobe signal.

Interface circuit 26 also includes first and second drivers 26b and 26c which receive from the microcomputer the address of the particular one of the crosspoint switches 28 which are to be opened or closed in response to the disconnect or connect command, respectively. One of the drivers (26c in FIG. 4b) also receives from the microcomputer the "1" or "0" which represents the command.

Figure 4B:
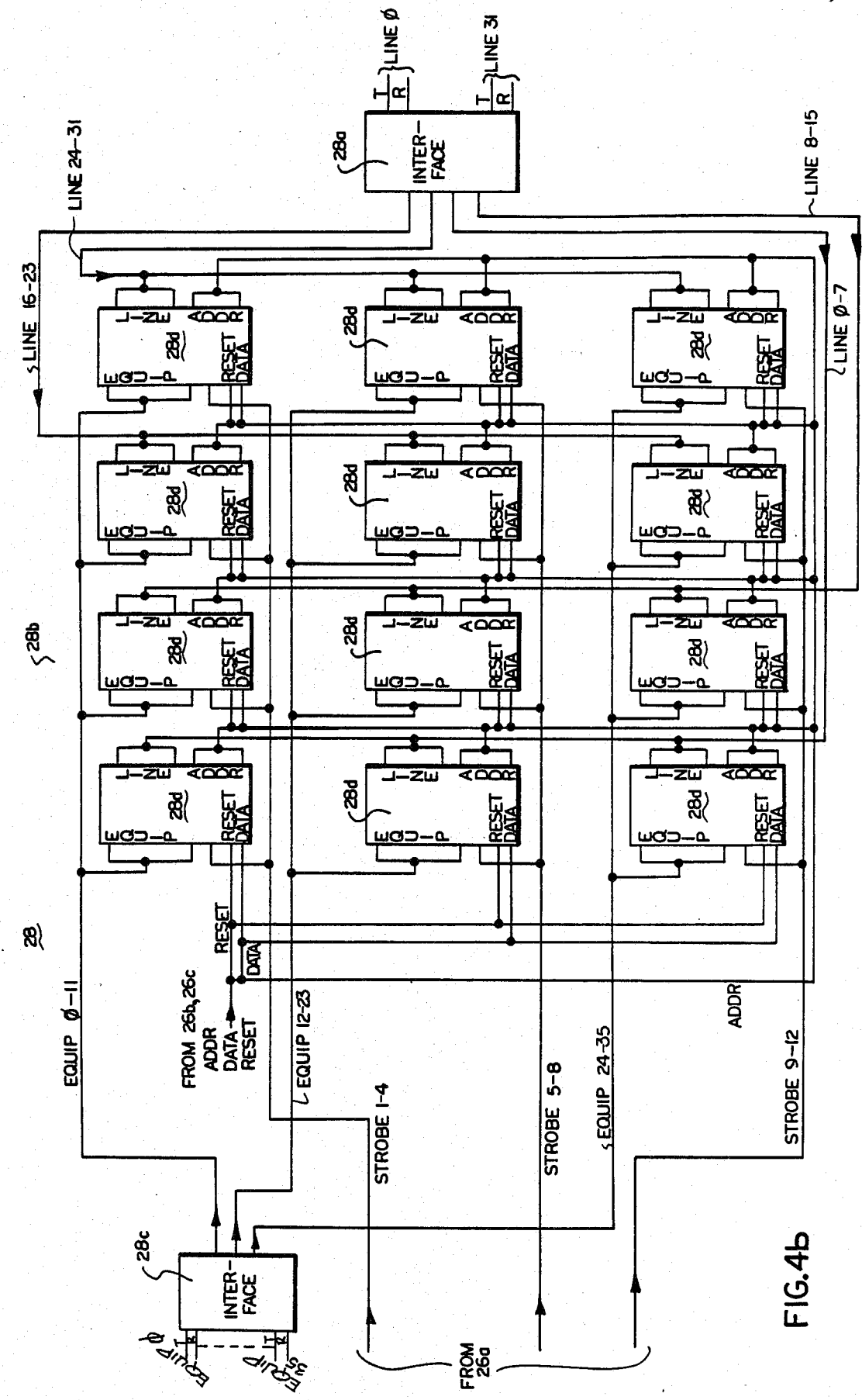
FIG. 4b shows a detailed circuit schematic for the switch part of the switch unit.

Referring now to FIG. 4b there is shown a block schematic diagram for crosspoint switches 28. Circuit 28 includes an input circuit 28a, a switch array 28b and an output circuit 28c. Switch array 28b is made up of 12 identical switch units 28d which are each embodied by the M093 analog crosspoint switch manufactured by SGS Semiconductor of Phoenix, Ariz. Each unit 28d is in the form of an 8×12 array, i.e., each unit is capable of having connected to it eight Line Side digital transmission lines and 12 Equipment Side digital transmission lines. When the units are arranged in a 4×3 array as shown in FIG. 4b, the DSX has the capability of connecting 32 Line Side digital transmission lines to 36 Equipment Side transmission lines. As embodied herein the DSX is used to connect 32 Line Side transmission lines to 32 Equipment Side transmission lines with the remaining four locations on the Equipment Side being available for use in testing any of the 32 lines through the DSX. In effect, the four remaining locations can be considered to be test access ports.

The particular Line Side and Equipment Side transmission lines which are connected to each of the units 28d in the 4×3 switch array 28b are given by row and column in Table 1 below:

TABLE 1

| | COLUMN | | | |
|---|---|---|---|---|
| ROW | 1 | 2 | 3 | 4 |
| 1 | Line 0–7 | Line 8–15 | Line 16–23 | Line 24–31 |
|   | Equip 0–11 | Equip 0–11 | Equip 0–11 | Equip 0–11 |
| 2 | Line 0–7 | Line 8–15 | Line 16–23 | Line 24–31 |
|   | Equip 12–23 | Equip 12–23 | Equip 12–23 | Equip 12–23 |
| 3 | Line 0–7 | Line 8–15 | Line 16–23 | Line 24–31 |
|   | Equip 24–35 | Equip 24–35 | Equip 24–35 | Equip 24–35 |

As shown in FIG. 4b, each unit 28d is capable of receiving a strobe signal. As described above in connection with FIG. 4a, the controller 24 causes a strobe signal to be generated which is unique to the particular unit wherein the lines to be connected or disconnected are located. The particular strobe signal received by each unit 28d in the 4×3 switch array 28b is given by row and column in Table 2 below:

TABLE 2

| | COLUMN | | | |
|---|---|---|---|---|
| ROW | 1 | 2 | 3 | 4 |
| 1 | STROBE 1 | STROBE 2 | STROBE 3 | STROBE 4 |
| 2 | STROBE 5 | STROBE 6 | STROBE 7 | STROBE 8 |
| 3 | STROBE 9 | STROBE 10 | STROBE 11 | STROBE 12 |

Each unit 28d also receives the address and data information generated by controller 24 in response to a command from the MU 30.

Input circuit 28a is used to connect the Line Side digital transmission lines to the associated one of the units 28d. Output circuit 28c is used to connect the Equipment Side digital transmission lines to the associated one of the units 28d. As described above in each electronic DSX there are two identical SU's. Each transmission line has two pairs of wires. The input and output circuits shown in FIG. 4b connect only one pair of wires for each Line Side and Equipment Side digital transmission line to the associated unit 28d. The other pair of wires associated with each transmission line is connected to the units 28d which are located on the other of the two SU's by input and output circuits also located on that SU.

Figure 5:
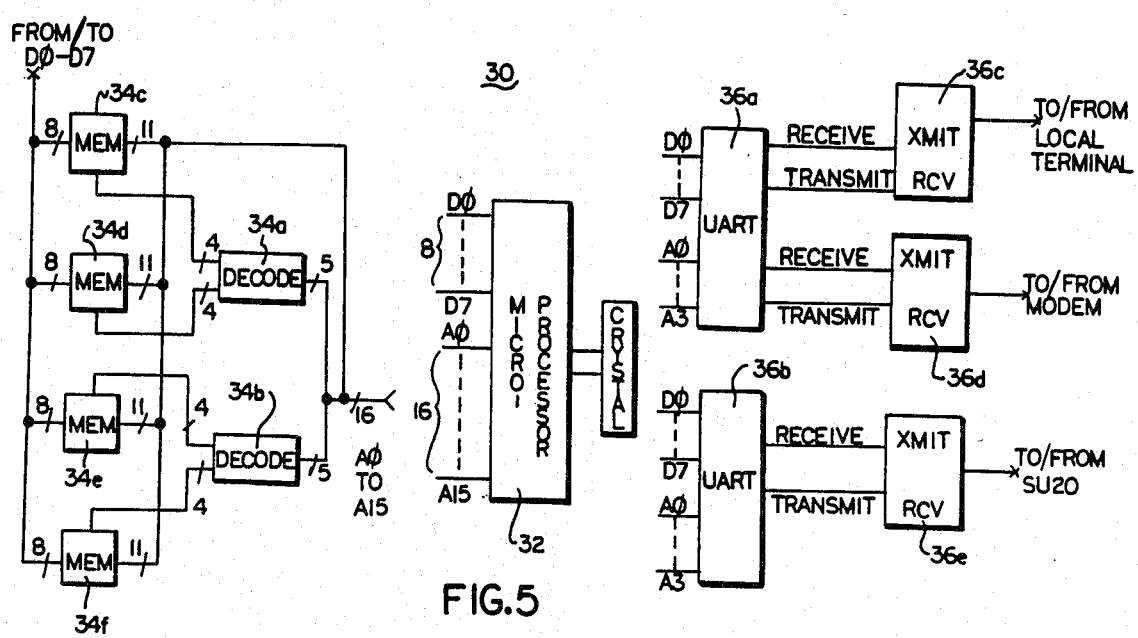
FIG. 5 shows a detailed circuit schematic for the master controller.

Referring now to FIG. 5 there is shown a detailed circuit schematic block diagram for microprocessor 32, memory 34 and interface 36 of MC 30. Microprocessor 32 may be implemented by any one of a number of well known chip types such as the 6809 chip available from Motorola. For ease of illustration and description, it will be assumed that the microprocessor is so implemented and the pin numbers and designators shown in FIG. 5 are those associated with that chip.

The microprocessor is connected to memory 34 which is made up of EPROM, EEPROM and RAM. The pins of the microprocessor 32 which carry the designators A0 to A15 provide signals which are used to address the memory. The pins carrying the designators D0 to D7 have on them the signals which are either the data read from the memory location addressed or the data to be written into that location.

A portion of the address signals are decoded by decoders 34a and 34b which can be implemented in the form of integrated fuse logic (IFL's). The signals from the decoders are then used to address one of the four chips 34c, 34d, 34e and 34f, which constitute the memory in this embodiment for memory 34. The data signals D0 to D7 from microprocessor 32 are connected directly to memory chips 34c to 34f. The remaining address signals address the same specific location in each chip 34c to 34f. Therefore, the address signals provide the address of the memory location to be addressed as well as the particular one of the four chips in which it is located, and the data signals carry the data which is either read from or written into that location.

Interface 36 includes first and second dual universal asynchronous receiver transmitters (UART's) 36a and 36b which may, for example, be implemented by the 2681 type chip available from either Signetics or Motorola. The pins designated as D0 to D7 and A0 to A3 on the microprocessor are also connected to 36a and 36b. Dual UART's 36a and 36b function as the interface between the various input and output ports of DSX 10 and devices connected thereto; and microprocessor 32. The UART's also function as the interface between SU 20 and microprocessor 32.

As described previously, DSX 10 may receive connect and disconnect commands either through a local terminal or from a remote terminal connected to the DSX by a modem. The local and remote terminals are connected through appropriate transmitters and receivers (shown in block form as 36c for the local terminal and 36d for the remote terminal) to UART 36a. After decoding the command, microprocessor 32 then checks the memory 34 to determine if the particular digital transmission lines to be connected or disconnected have already been previously so connected or disconnected. If they have not, the microprocessor then sends the command to the SU 20 through UART 36b and appropriate transmitters and receivers shown in block form as 36e. SU 20 transmits a signal acknowledging receipt of the command to microprocessor 32 through block 36e and UART 36b.

While not shown in FIGS. 3a, 3b, 4a, 4b and 5, it should be appreciated that the electronic form of DSX 10 also includes two groups of jacks 17, 19. These groups function in a manner identical to that described previously for the electromechanical DSX. They allow for patching and monitoring in the electronic DSX.

The manner in which DSX 10 operates will now be described with reference to the figures. In its electromechanical form DSX 10 provides a cross connection between the Line Side and Equipment Side digital transmission lines. The particular lines which are cross connected to each other are determined by the connection made between the terminals on blocks 16a and 16b. For purposes of description hereinafter let it be assumed that DSX 10 is capable of cross connecting a selected one of 32 Line Side lines to a selected one of 32 Equipment Side lines. Let it also be assumed that in its electromechanical form, the terminals of blocks 16a and 16b are wired to each other such that a line on the Line Side is connected directly to the corresponding line on the Equipment Side, i.e., line 1 to line 1, line 2 to line 2, etc. In effect this one to one cross connection causes the Equipment Side lines to "appear" at block 16a.

In converting from the electromechanical form of DSX 10 to the electronic form, the LED only board 15 and the strapping boards 18a, 18b are replaced by MC 30 and SU 20, respectively. The cross connect can now be accomplished electronically by issuing a connect command to the crosspoint switches. The commands are in predetermined format in which the connect command and the lines involved are indicated. The command may be transmitted to MC 30 either through a local terminal or through a modem.

MC 30 checks to determine if the command is valid, if it is in the proper format, and if those lines have previously been connected. If the command is valid and has been previously executed, MC 30 places the command in the proper format for transmission to both of the SU's 20 in the DSX. Upon receipt both SU's will send an acknowledgment back to MC 30. MC 30 updates the table in the EEPROM. If the acknowledgment is not received at MC 30 within a predetermined time, a failure is indicated.

The SU's then place the command in the proper format so that all of the analog crosspoint switches are addressed. The particular switches which are to be closed on each SU to accomplish the desired cross connection receive the strobe signal. The connect command is also sent to all of the switches. The switches receiving the strobe signal close to thereby cross connect the desired Line Side and Equipment Side lines.

If it is desired to disconnect previously connected Line Side and Equipment Side lines the sequence of events is identical to that described above. The only difference is that a disconnect command is entered into MC 30.

In FIGS. 3a, 3b, 4a, 4b and 5 electronic DSX 10 has been shown as having only two SU's 20 and one MC 30. This combination has been previously referred to as a chassis. In accordance with the teachings of this invention it is possible for the electronic DSX to be expanded so that integral multiples of N lines can be cross connected electronically. This expansion is accomplished by increasing the number of SU's 20 (and therefore the number of chassis) in the DSX. While each group of two SU's that are added can have their own associated MC 30, it has been found that a single MC has the capability of controlling a number of SU's. The single MC and the number of chassis, i.e. SU's, it can control will be referred to hereinafter as a "bay". The size of the bay is determined by the number of chassis which can be vertically stacked in a telephone central office rack which is typically seven (7) feet in height.

It should be understood that when the DSX of the present invention is embodied in the form of a single bay, the bay has in it a multiple number of chassis each of which has two SU's 20. Only one of the chassis has therein a MC 30. All of the other chassis have therein the LED only board 15, previously described. That board is in the location wherein the MC 30 would be located on a single chassis embodiment of DSX 10. Thus, DSX 10 may be embodied in the form of a single chassis having one MC 30 and two SU's 20 or in the form of a multiple number of chassis (only one of which has a MC 30) arranged in a bay.

It should be appreciated that in order for one MC to control a number of SU's it is necessary to add some additional circuitry that will allow the connect or disconnect command to select between each group of two SU's, i.e., select between chassis. This additional circuitry is not shown as the form it could take is well known to those skilled in the art. The circuitry primarily consists of providing each group of two SU's 20 with its own unique address. The format of the command would also include the address of the pair of SU's 20 to which the lines to be connected or disconnected are associated with. It should also be appreciated that the SU's are added in the form of a chassis which has in it two SU's as well as the associated groups of jacks 17, 19 and LED's. It should further be appreciated that as each chassis is added the chassis must also be physically wired to each other in a manner identical to that used when voice frequency intermediate or main distribution frames are expanded.

Figure 6:
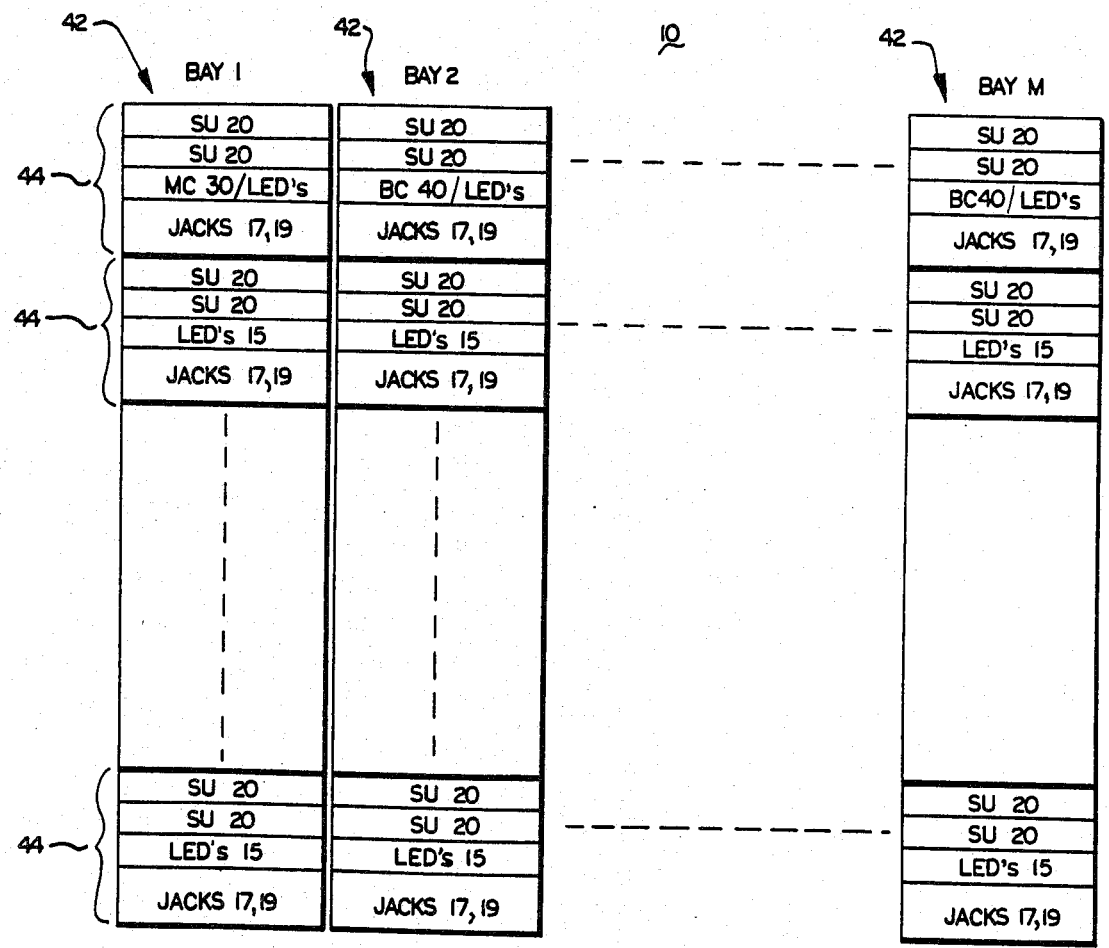
FIG. 6 shows a block diagram for the DSX of the present invention embodied in the form of a multiplicity of bays.

Expansion of the electronic DSX beyond a single bay requires the addition of circuitry in the form of a bay controller (BC) 40. Each bay must have in it a BC 40. The BC's are connected to the MC and provides the link by which a single MC 30 can control a number of bays. Referring now to FIG. 6, there is shown in block diagram form a DSX 10 which has M bays 42, each of which have up to a predetermined number of chassis 44 therein. Each chassis has two SU's 20 therein. It has been found that a single MC 30 (shown in FIG. 6 as being part of the topmost chassis 44 in the leftmost bay 42) can control up to 22 bays, each of which can have up to eight chassis 44 (or 16 SU's 20) therein. If each bay 42 has in it the maximum number of chassis 44 and if each pair of SU's allows for the cross-connection of 32 Line Side digital transmission lines to 32 Equipment Side digital transmission lines, then one bay can allow for 256 Line Side lines to be cross-connected with 256 Equipment Side lines. The 22 bays 42 would then allow for a maximum of 5632 Line Side digital lines to be cross connected with the same number of Equipment Side digital lines all under the control of a single MC 30.

The circuitry for BC 40 need not be shown as the form it could take is well known to those skilled in the art. BC 40 consists of receivers and transmitters connected to MC 30 to receive and transmit signals therefrom. It also includes receivers and transmitters connected to the pairs of SU's 20 contained in the bay 42 in which the BC 40 is located. BC 40 also includes means such as switches by which the BC would be given a unique address. The connect or disconnect command would also include the address of the particular BC 40 associated with the lines to be connected or disconnected. Therefore, BC 40 also includes circuitry to decode the address from the formatted command received from MC 30. If desired, BC 40 may also include a microcomputer so that self-diagnostic test routines can be performed. It should be understood, however, that it is not necessary for the performance of the DSX of the present invention for BC 40 to include such a microcomputer.

Figure 7A:
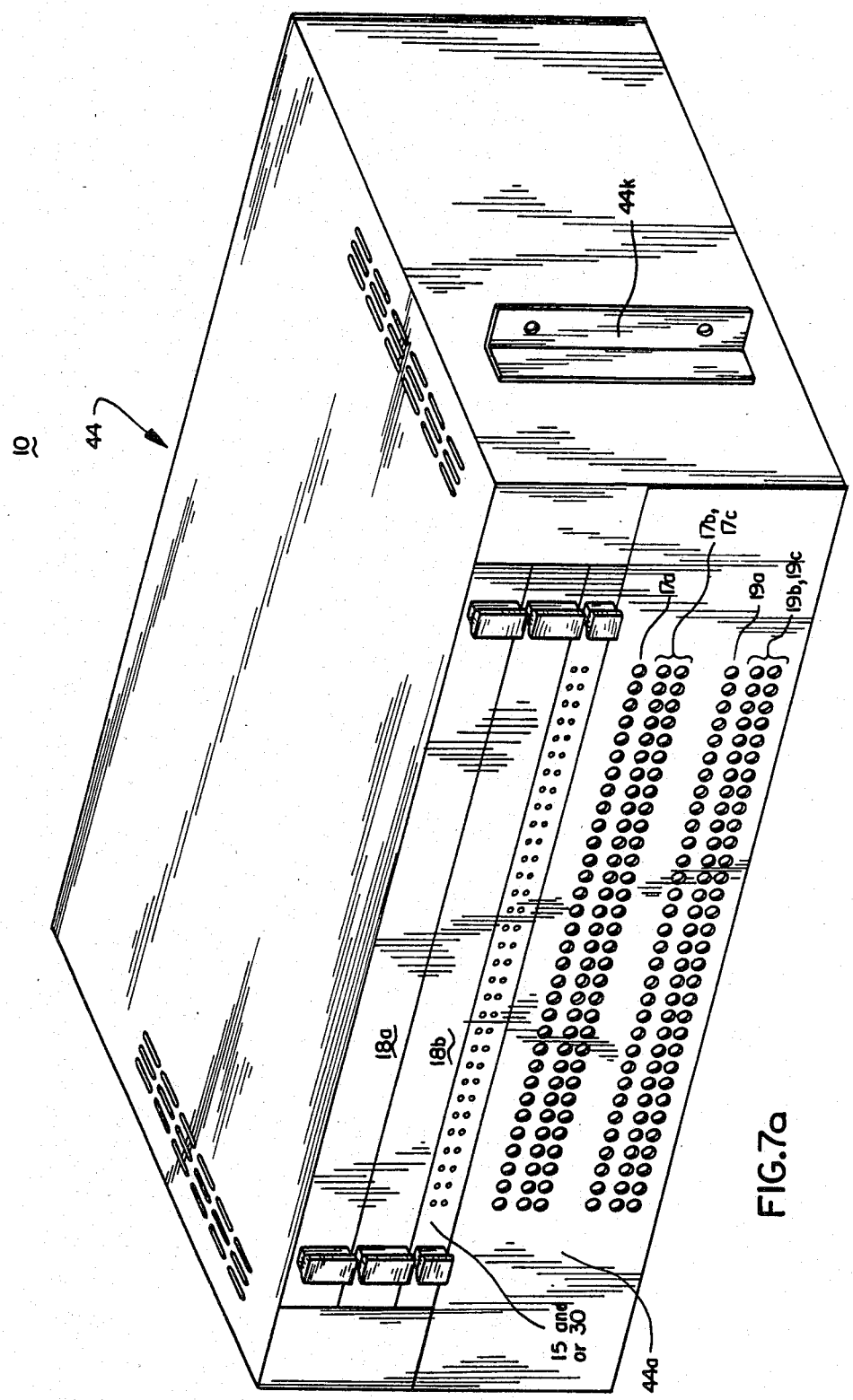
FIGS. 7a and 7b show combined perspective views for an embodiment of a single chassis for DSX 10.
Figure 7B:
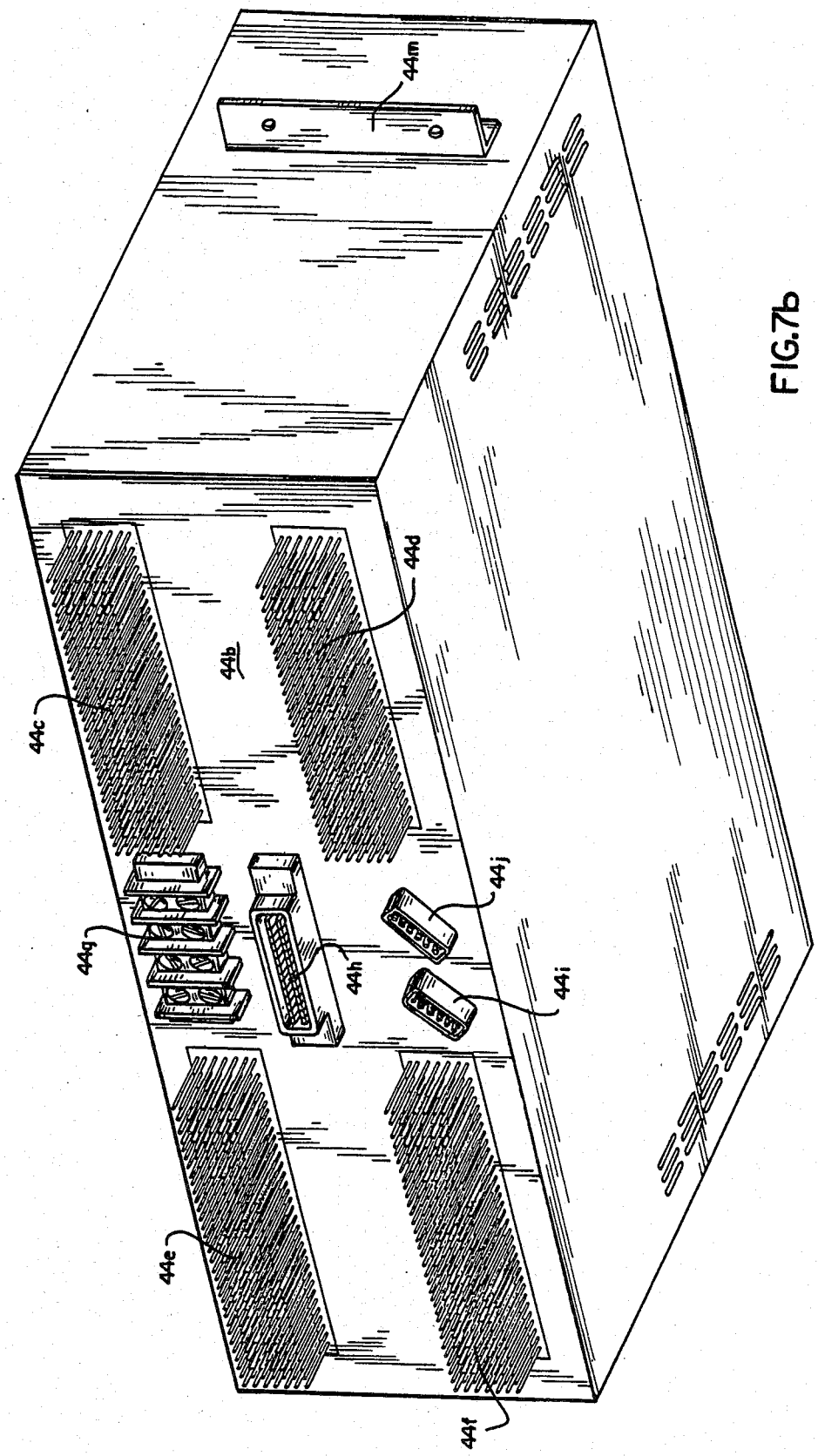

Referring now to FIGS. 7a and 7b, there are shown perspectives illustrating in FIG. 7a the front, top and right side view and in FIG. 7b the rear, bottom and left side view of an embodiment for chassis 44. As shown in FIG. 7a, the front face 44a of chassis 44 includes jacks 17a and 19a which as previously described allow for the monitoring of the digital signals in the Line Side and Equipment Side transmission lines, respectively. Front face 44a also includes jacks 17b, 17c, 19b, 19c which as previously described allow for the insertion of a plug to thereby effect a temporary cross connection between one of the Line Side and one of the Equipment Side digital lines.

Front face 44a also allows for the insertion of circuit boards 18a, 18b which may either be the strapping boards in the electromechanical form of DSX 10 or the boards containing the switch unit (SU 20) in the electronic form of DSX 10. Front face 44a also allows for the insertion of either the LED only board 15 in the electromechanical form of DSX 10 or a board containing both the LED's and MC 30 when DSX 10 is embodied as a single chassis 44 in its electronic form. When DSX 10 is embodied by a multiplicity of chassis 44 arranged in a single bay only one of the chassis has inserted therein the board containing both the MC 30 and the LED's. All of the remaining chassis in the bay have inserted therein the LED only board 15. When DSX 10 is embodied in the form of a multiplicity of bays each having a multiplicity of chassis then only the first chassis in the first bay has the board containing both the MC 30 and the LED's. The first chassis in each of the other bays has the board containing both BC 40 and the LED's. All of the other chassis in all of the bays have the LED only board 15. It should be appreciated that chassis 44 includes suitably arranged receptacles of any type well known in the art for removably receiving the circuit boards.

As shown in FIG. 7b, rear face 44b has mounted on it the Line Side 44c, Equipment Side 44d and cross-connect terminal fields 44e, 44f. Each of the terminals fields 44c, 44d, 44e, 44f are arranged in a 32 by 7 array which is more more than sufficient in number to accommodate the 32 Line Side and 32 Equipment Side fourwire digital transmission lines which can be connected to each chassis 44. The Line Side digital lines are connected to terminal field 44c and the Equipment Side digital lines are connected to terminal field 44d.

Terminal field 44c is wired inside of the chassis 44 by way of the jack fields 17b, 17c to a set of terminals which are associated with boards 18a, 18b. This wiring results in the Line Side lines being connected through the jack fields 17b, 17c to the boards 18a, 18b as shown in FIGS. 2a, 2b. Boards 18a, 18b also have associated therewith another set of terminals which are wired inside of chassis 44 to terminal field 44e. This wiring results in the connection of boards 18a, 18b to block 16a as shown in FIGS. 2a, 2b. Terminal field 44d is wired inside of the chassis 44 by way of jack fields 19b, 19c to terminal field 44f. Block 16b is also connected to terminal field 44f. This wiring results in the Equipment Side lines being connected through those jack fields to block 16b as shown in FIGS. 2a, 2b.

While not shown in FIGS. 7a and 7b the manner in which that internal wiring may be accomplished is well known to those skilled in the art. Wires may then be connected between selected ones of the terminals on fields 44e and 44f in order to accomplish the desired cross connection. While terminals fields 44c, 44d, 44e and 44f are shown in FIG. 7b as being of the wire-wrap type, they can be of any type well known in the art.

Rear face 44b also includes power and ground terminals 44g which allow the various voltages needed for operation of DSX 10 to be applied thereto. The rear face also includes a Bay/Master adapter terminal field 44h and two control terminal fields 44i and 44j. When chassis 44 is used in the multiple bay configuration shown in FIG. 6, there is one chassis in each of the bays (other than the first bay) which contains BC 40. Each BC 40 must be connected to the MC 30 located in the first chassis of the first bay. That interconnection is accomplished by the well known technique of daisy-chaining the field 44h of the first chassis of the first bay to that chassis of each of the other bays which includes the BC 40. Also as described previously a single MC or BC can in the same bay control a multiple number of chassis. Terminal fields 44i and 44j allow for that control. For example, terminal 44j of the topmost chassis is connected by a suitably arranged cable to terminal 44i of the next lower chassis. Terminal 44j of that chassis is connected to terminal 44i of the chassis next below etc. until all of the chassis in a single bay are so interconnected.

Chassis 44 also includes mounting flanges 44k and 44m, which allow chassis 44 to be mounted in a suitably arranged equipment rack located at the facility where DSX 10 is installed.

The strapping boards 18a, 18b of the electromechanical form of the DSX of the present invention have been described as providing a straightthrough connection for the N Line Side lines at blocks 14a, 14b to block 16a. It should be appreciated that those boards may be wired so as to provide other than a straightthrough connection. It should also be appreciated that the strapping boards have been designed such that they are easily removable from the chassis of the DSX. It is that removability which allows for the substitution of electronic circuit boards (SU's 20) in place of the strapping boards so that an electromechanical DSX can be easily converted to an electronic DSX without having to change the chassis. It is also the design of the LED only board 15 that allows it to be easily removable from the chassis and therefore replaceable by either an MC 30 board or a BC 40 board, as necessary, when the electromechanical DSX is converted to an electronic DSX. Thus, the present invention allows a DSX to be either electromechanical or electronic in form and provide in both forms the traditional features of monitoring and patching without the necessity to change the chassis as the DSX changes its form.

It should also be appreciated that in both the electromechanical and electronic form the Equipment Side digital transmission lines always are connected to block 16b. It should further be appreciated that the effect of the cross-connection between blocks 16a and 16b, which is represented symbolically in FIG. 2a by the "X" is to cause all of the Equipment Side lines to be connected to any one of the terminals of block 16a. Block 16a is connected to one of the two sets of terminals on boards 18a, 18b. In effect, the cross connection between blocks 16a and 16b allows any one of the Equipment Side lines to be connected to boards 18a, 18b. The Line Side lines are connected to the other set of terminals on boards 18a, 18b. Thus, the strapping boards 18a, 18b in the electromechanical form of the DSX or the electronic circuits inserted therefor in the electronic form of the DSX then allow the Line Side lines to be connected to the Equipment Side lines in any desired order.

There is given below a listing for the program contained in the microcomputer of SU 20 which processes the connect or disconnect commands from MC 30 to thereby control the operation of crosspoint swit hes 28. That listing contains a total of 18 pages and has the name "SWITCH". There is also given below listings for those routines executed by the microprocessor 32 in MC 30 in order that a connect or disconnect command can be sent by MC 30 to SU 20. Those listings contain a total of eight (8) pages and have the names "CONN.C"; "DISCN.C"; "GETF.C" and "SENDF.C". While microprocessor 32 may have to execute additional software, listings for that software are not included. The form that that software should take would, in view of the above description, be obvious to one skilled in the art.

While the DSX has been specified as that intermediate terminating point where DS-1 equipment and transmission facilities can be interconnected, it should be appreciated that the cross connect frame of the present invention can be used for digital signals transmitted at DS-1 and higher rates independent of the signal format. Such higher rates include signals of the well-known DS-1C, DS-2, DS-3, DS-4, etc. types. The cross connect frame of the present connects a specified Line Side line without reducing the signal present on the connected lines to its constituent parts. Thus, the operation of the cross connect frame of the present invention is independent of signal transmission rate and format.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

```
***************************************************************
*
*  SWITCH.SA
*
*          Copyright 1985 by Reliance Comm/Tec
*
         ORG     0
PORTA    RMB     1          I/O Port A
PORTB    RMB     1          Output Port B
```

```
PORTC   RMB     1               I/O Port C
PORTD   RMB     1               Input Port D
DDRA    RMB     1               Port A Data Direction Register
DDRB    RMB     1               Port B Data Direction Register
DDRC    RMB     1               Port C Data Direction Register
NOTUSE  RMB     1               Not used
TDR     RMB     1               Timer Data Register
TCR     RMB     1               Timer Control Register
MR      RMB     1               MISC
XPDBIT  EQU     7               ; Crosspoint direction bit
XPDPRT  EQU     1               ; Crosspoint direction port
        ORG     $40
STRT    EQU     0               Frame definitions              (8)
ADDR    EQU     STRT+1
CMD     EQU     ADDR+2
DATA    EQU     CMD+1
CHECK   EQU     DATA+3
STOP    EQU     CHECK+2
FRSIZ   EQU     STOP+1
FRAME   RMB     FRSIZ           Input frame (MCU)
OFRAME  RMB     FRSIZ           Output frame to MCU
CKSUM2  EQU     OFRAME+CHECK    ; Upper byte of checksum in return frame
CKSUM1  EQU     OFRAME+CHECK+1  ; Lower byte of checksum in return frame
* NOTE: all checksums are calculated in the return frame even input
FLAGS1  RMB     1               Flags register
XIND    RMB     1               X-coord INDex register
YIND    RMB     1               Y-coord INDex register
XVAL    RMB     1               X-addr for XPOINTS
YVAL    RMB     1               Y-addr for XPOINTS
ACKNAK  RMB     1               Temp storage of ACK/NAK byte
INBYCT  RMB     1               RESERVE MEMORY FOR THE IN BYTE COUNTER
OUBTCT  RMB     1               RESERVE MEMORY FOR THE OUT BIT COUNTER
INTCNT  RMB     1               RESERVE MEMORY FOR THE INTERUPT COUNT
OUBYCT  RMB     1               RESERVE MEMORY FOR THE OUT BYTE COUNTER
SCRAT2  RMB     1               SCRATCH LOCATION FOR OUTPUT
HRDADR  RMB     1               HARDWARE ADDRESS MEMORY LOCATION
ADRTEM  RMB     1               TEMPORARY ADDRESS BIT LOCATION
INCNT   RMB     1               INTERRUPT COUNTER FOR RECIEVING
VALIN   RMB     1               VALUE INTO CHECKSUM ROUTINE
CSCNT   RMB     1               CHECK SUM COUNTER
XTEMP1  RMB     1               ; Temporary variable for XPOINT routine
XTEMP2  RMB     1               ; Temporary variable for XPOINT routine
XTEMP3  RMB     1               ; Temporary variable for XPOINT routine
XTEMP4  RMB     1               ; Temporary variable for XPOINT routine
* Some definitions:
XMASK   EQU     %11110000       ; Mask to save all but X address
YMASK   EQU     %10001111       ; Mask to save all but Y address
SMASK   EQU     %11110000       ; Mask to save all but strobe address
STRBIT  EQU     3               ; STROBE BIT
STRPRT  EQU     2               ; STROBE PORT
*NOSTRO EQU     4               ; No strobe code                        (6)
INHBIT  EQU     4               ; Bit position for inhibit on strobe decoder (6)
INHPRT  EQU     PORTC           ; Port for inhibit on strobe decoder    (6)
ENBIT   EQU     0               ; !Enable to serial link bit            (6)
ENPRT   EQU     PORTC           ;                                       (6)
DATBIT  EQU     6               ; Data out                              (6)
DATPRT  EQU     PORTA           ;                                       (6)
*
*       This module drives the T-streamer switch controller command
*       routines.
*
* Routines are:
*
*       CLRXPT()                - clears all crosspoint switches
*
*       CONNEC(x,y,strobe)      - connect a crosspoint
*
*       DISCON(x,y,strobe)      - disconnect a crosspoint
*
```

```
*       FRMOUT(acknak)      - build a return frame
*
*       TSTACK(x,y)         - check for valid crosspoint addresses
*
*       XPOINT(x,y)         - get the crosspoint address
*
        ORG     $080
*
START   EQU     *
        SEI
        RSP
        LDA     #%00001000  Initialize flags for interrupt routine
        STA     FLAGS1
        CLR     INTCNT  ; Required initialization for fram out        (7)
* Set direction of I/O ports
        LDA     #%11001111  Bits 4 & 5 are inputs, all others are outputs
        STA     DDRA
        LDA     #$FF        Port B is output only
        STA     DDRB
        BSET    INHBIT,INHPRT ; inhibit to strobe decoder              (6)
        LDA     #$9D        ; C port direction                         (6) (3)
        STA     DDRC
        BSET    INHBIT,INHPRT                                          (6)
        BSET    ENBIT,ENPRT ; Serial enable to disabled                (6)
        BSET    DATBIT,DATPRT ; Data to space                          (6)
        LDA     #$40
        STA     MR
        STA     TCR
* Clear all I/O ports
        CLR     PORTA
        CLR     PORTB
* Remove strobe chip setup which is no longer necessary                (6)
        BSET    STRBIT,STRPRT ; strobe will always be active           (6)
*
WAIT    BRSET   1,PORTC,NOCLRX ; Change direction of test to match hardware (6)
* Clear all crosspoints
        JSR     CLRXPT
NOCLRX  EQU     *
*
* Waiting for a frame
*
MAINLP  JSR     FRAMCP    Go to the frame complete subroutine
        BRCLR   6,FLAGS1,MAINLP
        BCLR    6,FLAGS1 ; moved                                       (3)
*
* Check the checksum
*
        LDA     #FRAME+ADDR ; Loads the exit value for summing
        STA     VALIN    ; Stores the enter value for the checksum routine
        JSR     CALCKS   ; Jumps to the checksum routine
        CMP     FRAME+CHECK+1  Check L.S.B.s of both checksums
        BNE     MAINLP
        LDA     CKSUM2   ; Loads the M.S.B. of chechsum
        CMP     FRAME+CHECK  ; Compares the M.S.B.'s
        BNE     MAINLP   ; Branch to main loop if they don't match
*
* Check the hardware address
*
        CLR     HRDADR   ; Clears a hardware address location
        BRSET   5,PORTC,ADR6ST ; Checks the seventh (6) bit of addr
        BRA     ADRLD    ; branch around setting the seventh bit
ADR6ST  BSET    6,HRDADR
ADRLD   LDA     PORTD    ; Loads 7 of the address bits into acc
        STA     ADRTEM   ; Store 7 of the addr bits
        BCLR    6,ADRTEM ; Clear the seventh (6) bit of addr
        LDA     HRDADR   ; Load the odd hardware address bit
        EOR     ADRTEM   ; Exclusive or address bits together
```

```
        STA     HRDADR      ; Store hardware address
        LDA     FRAME+ADDR+1  Check L.S.B. of switch unit address
        CMP     HRDADR      ; Compare hardware address with data
        BNE     MAINLP
        CLRA
        BRCLR   6,PORTC,ADDRCK  Get the most significant bit
        INCA                of the card address
ADDRCK  CMP     FRAME+ADDR  Check most significant bit
        BNE     MAINLP
*
* Decoding & executing commands
*
        LDA     FRAME+CMD
        CMP     #$31    Check for connect command
        BNE     CMD2
        JSR     CONNEC  Connect crosspoints
        BRA     ACKNOW
*
CMD2    CMP     #$32    Check for disconnect command
        BNE     CMD3
        JSR     DISCON  Disconnect crosspoints
        BRA     ACKNOW
*
CMD3    CMP     #$33    Check for test acknowledgement command
        BNE     CMD4
        JSR     TSTACK  Test for valid crosspoint address
        BRA     OUTPUT
*
CMD4    CMP     #$34    Check for clear crosspoints command
        BNE     CMD5
        JSR     CLRXPT  Clear all crosspoints
        BRA     ACKNOW
*
CMD5    CMP     #$35    Check for set xpt cmd           (8)
        BNE     INVALD
        JSR     SETXPT  Set xpt, disc all conflicting pts
*
ACKNOW  LDA     #6      ACKnowledgement byte
        BRA     OUTPUT
INVALD  LDA     #$15    Negative AcKnowledgement byte
OUTPUT  JSR     FRMOUT  Set up the output frame
*
* Set the output frame bits
*
        BSET    2,FLAGS1 ; Sets the XMT output flag
        BSET    4,FLAGS1 ; Sets the Req output flag
*
* Enable the XMT interrupt
*
        BCLR    6,MR    ; Enable int2 for transmit
        CLI
*
* Wait until the frame is sent back to MCU
*
OUTLUP  BRSET   2,FLAGS1,OUTLUP
        SEI
        BSET    6,MR
        JMP     MAINLP
*
*       This module contains the routines which execute a command
* given by the master controller.
*
*
* Connect a crosspoint subroutine
*
CONNEC  EQU     *
        LDA     FRAME+DATA  Get Y address
```

```
            STA     YVAL
            LDA     FRAME+DATA+1  Get X address
            STA     XVAL
            BSET    XPDBIT,XPDPRT  Set crosspoint
            JSR     XPOINT
            RTS
*
* Disconnect a crosspoint subroutine
*
DISCON  EQU     *
            LDA     FRAME+DATA   Get Y address
            STA     YVAL
            LDA     FRAME+DATA+1  Get X address
            STA     XVAL
            BCLR    XPDBIT,XPDPRT Clear crosspoint
            JSR     XPOINT
            RTS
*
* Test acknowledgement subroutine
*
TSTACK  EQU     *
            LDA     FRAME+DATA   Check Y address
            SUB     #$30         Remove 30 hex offset
            BLO     NAK          Check if Y<0
            CMP     #31
            BHI     NAK          Check if Y>31
            LDA     FRAME+DATA+1  Check X address
            SUB     #$30         Remove 30 hex offset
            BLO     NAK          Check if X<0
            CMP     #35
            BHI     NAK          Check if X>35
            LDA     #6           ACK signal
            RTS
NAK         LDA     #$15         NAK signal
            RTS
*
*       Set crosspoints specified in frame.  Disconnect all other points
*       on given input and outputs.
*
SETXPT  LDA     FRAME+DATA+1   Crosspoint
            CMP     #$2F
            BEQ     MXPT         2F=no connection
            BSR     CONPT        Connect crosspoint
MXPT        LDA     FRAME+DATA+2  Monitor crosspoint
            CMP     #$2F
            BEQ     DIS
            BSR     CONPT        Connect monitor point
*
DIS         LDX     FRAME+DATA+1 Disconnect all but pts just connected
            STX     XIND         Save xpt and monitor pt to check against
            LDX     FRAME+DATA+2
            STX     YIND
            BCLR    XPDBIT,XPDPRT
            LDA     FRAME+DATA
            STA     YVAL         Input
            LDA     #(35+$30)    Max. output + offset
            STA     XVAL
            BSR     DISPTS       Disconnect all other outputs
            LDA     FRAME+DATA
            STA     XIND
            LDA     #$80         Flag to disconnect inputs
            STA     YIND
            LDA     FRAME+DATA+1
            CMP     #$2F
            BEQ     MONDIS       EQ-)No connection
            STA     XVAL         Output to be disconnected from
            LDA     #(31+$30)    Max. input + offset
            STA     YVAL
```

```
        BSR     DISPTS    Disconnect
MONDIS  LDA     FRAME+DATA+2
        CMP     #$2F
        BEQ     RETDIS
        STA     XVAL      Monitor point to be disconnected from
        LDA     #(31+$30)
        STA     YVAL
*
DISPTS  CMP     XIND
        BEQ     NXTXP     EQ-)do not disconnect this point
        CMP     YIND
        BEQ     NXTXP     EQ-)do not disconnect this point
        JSR     XPOINT    Disconnect the point
        LDA     XVAL
        ADD     #$30      Add offsets back in
        STA     XVAL
        LDA     YVAL
        ADD     #$30
        STA     YVAL
NXTXP   LDX     #XVAL
        LDA     YIND      Deleting inputs or outputs?
        CMP     #$80
        BNE     CKDONE    NE-)inputs, so get input value
        LDX     #YVAL          to decrement
CKDONE  DEC     ,X
        LDA     ,X        If $2F, loop is finished
        CMP     #$2F
        BNE     DISPTS
RETDIS  RTS
*
CONPT   STA     XVAL      Output or monitor output
        LDA     FRAME+DATA
        STA     YVAL      Input
        BSET    XPDBIT,XPDPRT
        JSR     XPOINT    Connect point
        RTS
*
* Return a frame to the interrupt transmit routine
*
FRMOUT  EQU     *
        STA     ACKNAK    Keep ACK/NAK signal for now
        LDX     #FRSIZ-1
REPEAT  LDA     FRAME,X   Transfer all bytes of the
        STA     OFRAME,X  input frame to the output
        DECX              frame
        BPL     REPEAT
        LDA     ACKNAK    Replace command code with
        STA     OFRAME+CMD ; Store the ACK/NAK byte in OFRAME
        LDA     #OFRAME+ADDR ; Loads the beginning byte for summing
        STA     VALIN     ; Stores the beginning value for summing
        JSR     CALCKS    ; Jumps to the check sum calculating routine
        RTS
*
* Clear all crosspoints
*
CLRXPT  EQU     *
        BCLR    XPDBIT,XPDPRT Clear the crosspoint
        LDA     #31       # of Y leads (0-31)
        STA     YIND
RESETX  LDA     #35       # of X leads (0-35)
        STA     XIND
DOLOOP  LDA     XIND
        ADD     #$30      Add the 30 hex offset
        STA     XVAL      Move X counter into a temporary variable
        LDA     YIND
        ADD     #$30      Add the 30 hex offset
        STA     YVAL      Move Y counter into a temporary variable
```

```
        JSR     XPOINT    Clear a crosspoint
        DEC     XIND
        BPL     DOLOOP    If XIND)=0, loop again
        DEC     YIND
        BPL     RESETX    If YIND)=0, reset X & loop again
        RTS
*
* Crosspoint addressing subroutine
*
************************************************************
*
* XPOINT.SA
*
*       Copyright 1985 by REliance Electric
*
*       Reliance Comm/Tec
*       Advanced Development Laboratory RRI
*       Ed Szczebak, Jr.
*       Febuary 6, 1985
*
*       This module contains code for strobing a crosspoint.
* It uses some table lookup to map actual channel numbers with ports.
*
* Entry:
*       XPOINT - On Entry the following items must be set:
*              YVAL - input port address.  0 - 31
*              XVAL - Ouptut port address. 0 - 35
*              Data line to matrix - Setup port for input or output.
*
*       Exit - Carry = 0 if crosspoint strobed.
*                      1 if crosspoint not strobed.
*
* Variables used:
*
*       YVAL   - From address passed to routine.
*       XVAL   - To address passed to routine.
*       XTEMP1 - A tempory variable used in this routine
*       XTEMP2 - Same
*       XTEMP3 - Same
*       XTEMP4 - Same
*
* Modifications:
*
****************************************************************
*
* Notes on table formats:
*
*       There are 6 tables used to map the crosspoints.
*
*       YMAP   - Maps input port number to Y address on matrix
*       XMAP   - Maps output port number to X address on matrix
*       INSTRO - Maps input port to a set of strobe codes
*       OUTSTR - Maps output port to a set of strobe codes
*       INSET  - Set of strobe codes pointed to by INSTRO
*       OUTSET - Set of strobes codes pointed to by OUTSTR
*
* NOTE: Value in table maps to position in output port
*   eg.
*
* TABLES:
YMAP    EQU     *
        FCB     $20,$10,$70,$70,$10,$20,$40,$00                    (3)
        FCB     $60,$60,$00,$40,$30,$50,$50,$30                    (3)
        FCB     $40,$00,$00,$40,$30,$50,$10,$10                    (3)
        FCB     $50,$30,$70,$60,$20,$20,$60,$70                    (3)
XMAP    EQU     *
        FCB     10,13,10,13,10,13,09,12                            (3)
```

```
            FCB     09,12,09,12,08,11,08,11                              (3)
            FCB     08,11,00,03,00,03,00,03                              (3)
            FCB     01,04,01,04,02,05,02,05                              (3)
            FCB     01,02,04,05                                          (3)
INSTRO      EQU     *
            FCB     0,0,0,2,2,2,0,0                                      (3)
            FCB     0,2,2,2,0,0,2,2                                      (3)
            FCB     3,3,1,1,3,3,3,1                                      (3)
            FCB     1,1,3,3,3,1,1,1                                      (3)
OUTSTR      EQU     *
            FCB     0,0,1,2,2,1,0,0                                      (3)
            FCB     1,2,2,1,0,0,1,2                                      (3)
            FCB     2,1,0,0,1,2,2,1                                      (3)
            FCB     1,1,2,2,1,1,2,2                                      (3)
            FCB     0,0,0,0
INSET       EQU     *
            FCB     07,09,11                                             (3)
            FCB     00,02,14                                             (3)
            FCB     03,08,15                                             (3)
            FCB     01,10,06                                             (3)
OUTSET      EQU     *
            FCB     07,00,03,01                                          (3)
            FCB     09,02,08,10                                          (3)
            FCB     11,14,15,06                                          (3)
* CODE SECTION:
XPOINT      EQU     *
            LDA     XVAL            ; Strip $30 offset from values
            SUB     #$30
            STA     XVAL
            LDA     YVAL
            SUB     #$30
            STA     YVAL
*           EQU     *               ; Get from address to setup x input
XPOIN2      EQU     *               ; This entry has binary no. in XVAL & YVAL
            LDX     YVAL
            CPX     #32
            BHS     XERR            ; Too big ?
            LDA     PORTB           ; Get current data
            AND     #YMASK
            ADD     YMAP,X
            STA     PORTB           ; X address is now set
            LDX     XVAL            ; Do the same thing for the output port
            CPX     #36
            BHS     XERR
            LDA     PORTB
            AND     #XMASK
            ADD     XMAP,X
            STA     PORTB           ; Address are now set up
* Now we must find which chip to strobe
            LDX     YVAL            ; Get input set
            LDA     INSTRO,X
            LSLA                    ; * 3 as 3 bytes per entry in INSET
            ADD     INSTRO,X
            STA     XTEMP1
            LDX     XVAL
            LDA     OUTSTR,X
            LSLA                    ; * 4 AS 4 bytes per entry
            LSLA
            STA     XTEMP2
            LDA     #3              ; INSET counter
            STA     XTEMP3
XLOOP1      EQU     *               ; Loop for going thru all 4 INSET entries
            CLR     XTEMP4          ; OUTSET counter
XLOOP2      EQU     *               ; Loop for going thru all 3 OUTSET entries
            LDA     XTEMP2
            ADD     XTEMP4
            TAX                     ; Pointer to OUTSET to compare
            LDA     OUTSET,X        ; Value
```

```
              LDX     XTEMP1          ; Pointer to INSET to compare
              CMP     INSET,X
              BEQ     XFND            ; If equal we have chip to use
              INC     XTEMP4          ; If not increment inner loop
              LDA     XTEMP4
              CMP     #4
              BLO     XLOOP2          ; End of inner loop
              INC     XTEMP1          ; Move pointer for outer loop
              DEC     XTEMP3          ; See if outer loop done
              BNE     XLOOP1
              BRA     XERR            ; If we get here the table is in error
XFND          EQU     *               ; A now has strobe value.
              STA     XTEMP1          ; Save it
              LDA     PORTA
              AND     #SMASK
              ADD     XTEMP1
              STA     PORTA
* Now do what we need to to strobe
* Changes here to strobe with inhibit to de-glitch line                     (6)
              BCLR    INHBIT,INHPRT   ; Active low to output                 (6)
              BSET    INHBIT,INHPRT   ; Inhibit strobe chip                  (6)
XGOOD         EQU     *               ; Where we exit on good strobes
              CLC
              RTS
XERR          EQU     *               ; Where we exit on errors
              SEC
              RTS
*
* Check sum calculating routine
*
CALCKS  LDA   #CHECK-ADDR             ; Loads the number of bytes to sum
        STA   CSCNT                   ; Stores the check sum count
        LDX   VALIN                   ; Loads the starting byte address for summing
        CLR   CKSUM1                  ; Clears the lower byte
        CLR   CKSUM2                  ; Clears the higher order byte
CKSLUP  LDA   ,X                      ; Loads the value from location 5+X
        ADD   CKSUM1                  ; Adds the checksum 1 to the value
        BCS   INCS2                   ; Branches if the carry bit is set
        BRA   NOCAR                   ; Branch around incrementing CHECKSUM2
INCS2   INC   CKSUM2                  ; Increments checksum 2 if carry was set
NOCAR   STA   CKSUM1                  ; Stores the checksum in its location
        INCX                          ; Moves the pointer
        DEC   CSCNT                   ; Decrements the byte counter index
        BNE   CKSLUP                  ; Branches back to another addition until finished
        RTS
****************************************************************************
*
* INTER03.SA
*
*       Copyright 1985 Reliable Electric
*
*       Reliable Electric
*       11333 Addison Street
*       Franklin Park, Illinois 60164
*       Keith Nusekabel
*       February 1,1985
*
*       This module is for handling interrupts to the switching unit
* processor in the T-STREAMER product
*
* Routines in this module
*
*       interu - label for branching into this routine
*
*       xmtint - the transmit portion of the interrupt handler starts there
*
*       zerout - branch for transmitting a zero on the output
*
```

```
*       reqen   - branch that handles setting the request lead
*
*       rqstst  - the request start branch of the request section
*
*       reqstp  - the request stop branch of the request section
*
*       rqsprt  - label for returning from the request stop branch
*
*       stbtse  - the start bit set branch of transmitting
*
*       spbtse  - the stop bit set branch of transmitting
*
*       seenrq  - set the request flag for branching to the request portion
*
*       setout  - branch for setting the out bit count
*
* This module is to be linked to other modules for the switch unit
*
* MODIFICATIONS
*
*
*************************************************************************
        NAM     INTERRUPT HANDLING ROUTINE 2/1/85
        IDNT    KEITH NUSEKABEL 2/1/85
        OPT     LLE=120
*
* BELOW IS THE RECIEVE INTERRUPT ROUTINE
* THE FIRST PORTION DOES MOST OF THE
* TESTS AND LOADS THE RECIEVED BYTE
* INTO MEMORY
*
INTERU  BRSET   2,FLAGS1,XMTINT
        BSET    6,MR             ; Clears int2 (clock interrupt)
        BCLR    7,MR             ; Clears int2 (clock interrupt)
        RTI
*
*****************************************************************
*
* Newint
*
* Copyright 1985 by Reliance Electric
*
* Reliance Comm/Tec
* Advanced Development Laboratory RRI &
* Reliable Electric
* Ed Szczebak, Jr.
* Febuary 4, 1985
*
* This module is a rewrite for the T-streamer switch unit
* for recieving data. The 2681 generating the 1X clock cheats
* and may shorten its cycle when it transmits data. To overcome
* this we will interrupt on the falling edge of data (ie. the start
* bit) and stay in a loop until all eight bits are read.
*
* Data will be on int.
* Clock will be on int2
*
* Entries:
*       STABIT - Interrupt entry for start bit
*****************************************************************
* Some definitions:
CLKPRT  EQU     3
CLKBIT  EQU     6
STABIT  EQU     *
        BCLR    7,MR
        BIH     NOTSTA           ; If interupt is high this is a previously
*                                ; Queued interupt not a start bit
```

```
              LDA     #8              ; Counter for number of bits.
              STA     INCNT           ;
      SBIT1   BRSET   CLKBIT,CLKPRT,SBIT1 ; Wait for clock to go low
      SBIT2   BRCLR   CLKBIT,CLKPRT,SBIT2 ; Wait for clock to go high
      SBIT3   BRSET   CLKBIT,CLKPRT,SBIT3 ; Wait for clock to go low then sample
              BIH     BITHIG          ; Get data from interrupt line
              CLC
              BRA     SAVBIT
      BITHIG  SEC
      SAVBIT  RORA
              DEC     INCNT
              BNE     SBIT2           ; If not done 8 bits get some more
      *
      * Now A has byte we have recieved.
      * Stop bit is still to come.
      *
      STBIT1  BRCLR   CLKBIT,CLKPRT,STBIT1
      STBIT2  BRSET   CLKBIT,CLKPRT,STBIT2
      * We should now be looking at the stop bit.
              BIL     NOTSTO          ; EXIT if bad stop bit
      * Store A where data needs to be.
              LDX     INBYCT          ; Load in_byte_count in X
              CPX     #FRAME+FRSIZ    ; Check for buffer overflow
              BHS     NOTSTA          ; Exit point.
              STA     ,X              ; Store byte into FRAME buffer
              INC     INBYCT          ; Increment the in_byte_count
              BCLR    1,FLAGS1        ; Clear shift in flag
              RTI
      * Bad stop bit resolution below
      NOTSTO  EQU     *               ; EXIT bad stop bit
              BSET    0,FLAGS1
              RTI
      * Bad start bit exit below
      NOTSTA  EQU     *               ; EXIT not start bit
              RTI
      *
      *
      XMTINT  BCLR    7,MR            Reset interrupt2
              BRSET   4,FLAGS1,REQEN  BRANCH IF REQ. SET
              LDA     OUBTCT          LOAD OUT BIT COUNT
              BEQ     SPBTSE          BRANCH IF 0 TO STOP BIT SET
              CMP     #9
              BEQ     STBTSE          TO START BIT SET
              ROR     SCRAT2          SET CARRY BIT
              DEC     OUBTCT          ; Dec out_bit_count
              BCC     ZEROUT          TO OUTPUT A 0
              BSET    6,PORTA         OUTPUT A 1
              RTI
      ZEROUT  BCLR    6,PORTA         OUTPUT A 0
              RTI
      *
      * THE BRANCH BELOW PREPARES THE REQUEST
      * PORT FOR TRANSMITTING DATA.
      *
      REQEN   INC     INTCNT          INCREMENTS THE INTERRUPT COUNTER
              BRSET   5,FLAGS1,REQSTP BRANCH IF END REQ.
              LDA     INTCNT          LOAD THE INTERRUPT COUNTER
              CMP     #$14            IS INT CNT > 20
              BLO     RQSTST          TO REQ. START SET
              BSET    5,FLAGS1        SET END/START FLAG
              BCLR    4,FLAGS1        RESET REQ. FLAG
      SYNC1   BRSET   CLKBIT,CLKPRT,SYNC1 ; Make sure clock is low when we
      *                                   ; exit so we will start on neg edge
              BCLR    7,MR            ; Clear previous int we probably got
              RTI
      RQSTST  LDA     #OFRAME         TO RESET OUT BYTE COUNT
              STA     OUBYCT          STORE IN OUT BYTE COUNT
              LDA     #9              TO RESET OUT BIT COUNT
```

```
          STA      OUBTCT    STORE OUT BIT COUNT
          BCLR     0,PORTC   TURN ON THE ENABLE LEAD
          BSET     7,PORTA   SET REQ. PORT
          BSET     6,PORTA   ; Sets the data high before XMTing
          RTI
*
* THE BRANCH BELOW HOLDS THE REQUEST
* PORT SET TILL 1 MS AFTER WE
* FINISH SENDING THE DATA
*
REQSTP    LDA      INTCNT    LOAD INTERRUPT COUNT
          CMP      #29       COMPARE TO 9
          BLO      RQSPRT    LEAVE REQ. SET BRANCH
          BCLR     7,PORTA   RESET REQ. PORT
          BSET     0,PORTC   TURN OFF ENABLE LEAD
          CLR      INTCNT    STORE INTCNT=0
          LDA      #8        TO RESET FLAGS
          STA      FLAGS1    RESETS FLAGS TO RCV DATA
          BSET     6,MR      Disable clock interrupt
          BCLR     7,MR      Disable clock interrupt
RQSPRT    RTI
*
* THE BRANCH LISTED BELOW SETS THE
* START BIT IN THE DATA STREAM
*
STBTSE    DEC      OUBTCT    DEC OUT BIT COUNT
          LDX      OUBYCT    STORE OUT_BYTE_COUNT FOR ADDRESSING
          LDA      ,X        LOAD ACC WITH OUT_BYTE_COUNT
          BCLR     6,PORTA   ; Clear the data port
          STA      SCRAT2
          RTI
*
* THE BRANCH BELOW SETS THE STOP BIT
* AND SETS THE END REQ. FLAG IF
* THE LAST BYTE HAS BEEN TRANSMITTED
*
SPBTSE    LDA      OUBYCT    GET OUT BYTE COUNT
          CMP      #OFRAME+FRSIZ  Out byte count=$21 ?
          BEQ      SEENRQ    TO SET END REQ. FLAG
          INC      OUBYCT    DEC OUT BYTE COUNT
          BSET     6,PORTA   ; Set the data port
          LDA      #9        TO RESET OUT BIT COUNT
          STA      OUBTCT    RESET OUT BIT COUNT
          RTI
SEENRQ    BSET     4,FLAGS1  SET REQ. FLAG
SETOUT    LDA      #9        TO RESET OUT BIT COUNT
          STA      OUBTCT    OUT BIT COUNT=9
          RTI
**********************************************************************
*
* RCVSUB03.SA
*
*        Copyright 1985 by Reliable Electric
*
*        Reliable Electric
*        11333 Addison Street
*        Franklin Park, Illinois 60131
*
*        Keith Nusekabel
*        February 1,1985
*
*        This module is for overseeing communications of the
*        switch unit board in the T-STREAMER product
*
* Routines in module
*
*        badfra - branch of the routine when a bad frame is detected
```

```
*
*       framcp  - a label for branching into this routine
*
*       loopr   - a loop that waits for an interrupt when waiting to recieve
*
* This routine is intended to be used with INTER03.SA interrupt
* handling routine
*
* MODIFICATIONS
*
*
***********************************************************************
         NAM      RECIEVING SUBROUTINE 2/1/85
         IDNT     KEITH NUSEKABEL 2/1/85
         OPT      LLE=120
BADFRA   BCLR     0,FLAGS1  CLEARS THE BAD STOP FLAG
FRAMCP   BSET     3,FLAGS1  SET THE RCV ENABLE FLAG
INBYOR   LDA      #FRAME    DATA FOR IN_BYTE_COUNT
         STA      INBYCT    INITIALIZE IN_BYTE_COUNT
         BSET     1,FLAGS1  SET SHIFT IN FLAG
         CLI
LOOPR    EQU      *
         BSR      DELAY
         BRSET    1,FLAGS1,LOOPR   LOOPS WAITING FOR A BYTE
         LDX      #FRAME         ; Do we have anything
         CPX      INBYCT
         BEQ      LOOPR          ; No data has been recieved
         LDA      FRAME          ; If some data check for start byte
         CMP      #$02
         BEQ      FRSOK
         STX      INBYCT         ; Realign frame
         BRA      LOOPR
FRSOK    EQU      *              ; See if complete frame?
         LDX      INBYCT
         CPX      #FRAME+FRSIZ
         BLO      LOOPR          ; Entire frame not recieved then loop back
         LDA      FRAME+STOP     ; Check ETX byte
         CMP      #$03
         BNE      BADFRA         ; Reset everything and try again BRSET    0,FLAGS1,BADFRA ; Bad stop bit so restart
* Have a good frame
         BCLR     1,FLAGS1       ; May not need these any more
         BSET     6,FLAGS1
         RTS
DELAY    EQU      *              ; Toggle deadman and delay
         LDA      PORTC
         EOR      #4
         STA      PORTC
         LDA      #$FF
DELAY1   LSLA
         BNE      DELAY1
         RTS
SWI      RTI                     ; I don't know what to do with this
         ORG      $FF8           ; Setup vectors
         FDB      INTERU
         FDB      STABIT
         FDB      SWI
         FDB      START
         END
```

```
/* CONN.C

Copyright 1985 by Reliance Electric

Convert ASCII string input to binary characters, assemble into 9-byte frame
and send out.  Read return frame and return TRUE if successful or FALSE if
not successful.

02-06-85    PKM RRI   Return CONNECTED rather than TRUE
    02-07-85    PKM RRI   Pass fp to getf and sendf
    02-21-85    PKM RRI   add EE debugging code
    02-27-85    PKM RRI   add EE map connect
    04-12-85    PKM RRI   clean-up
    05-09-85    PKM RRI   write to status word
    06-04-85    PKM RRI   check for EEPROM initialized
    06-07-85    PKM RRI   change write to cparray, add mcon
    06-24-85    PKM RRI   add EEPROM check
    09-26-85    PKM RRI   add retries
    10-07-85    PKM RRI   extra data byte in frame
    10-10-85    PKM RRI   pass file ptr to terminal
*/ include <stdio.h>
include "eedef.h"
#include "cmdcodes.h"
#include "errcode.h" /* error and success codes */
#include "semaphor.h"

conn(ptr,fp,fp1)             /* connect crosspoint */
char *ptr[];
FILE *fp,*fp1;
{
  return(consub(ptr,fp,xpt,fp1));
} mcon(ptr,fp,fp1)             /* connect monitor */
char *ptr[];
FILE *fp,*fp1;
{
  return(consub(ptr,fp,mon,fp1));
} consub(ptr,fp,type,fp1)
char *ptr[],type;
FILE *fp,*fp1;
{
   extern int retryctr;
   char bin[7],rplce[3],*xptc,*fgetse();
   int result,i.i;
   struct blklinks *node;
   struct cpdata *cp;

if (!checkee()) return (SYSNINIT);
   if (!ascbin(ptr[0],bin) || !ascbin(ptr[1],&bin[3]) || valdat(bin) == SYNTAX)
       return(SYNTAX);                /* return if syntax error */
   if ((node=findent((int)(*bin)*16 + (int)*(bin+1),*((int *)&LISTHEAD))) ==
NULL) /* su in EEPROM? */
       return (SUNX);                 /* no, return error code */
  /* check to see if either point is already connected */
  result = FALSE;
  cp=node+1;
  for (j=xptc=0; j,=1, j++){
      for (i=0); i,=31; i++){
          if (cp-)cparray[i][j] == bin[5]) {
              result = TRUE;
```

```
              xptc=&cp->cparray[i][j];       /* save addr for map maintenance */
              break;
           }
        }
        if (result == TRUE) break;
     }
     if (cp->cparray[bin[2]][type] != CPINIT)
        result = TRUE;
     if (result == TRUE){
        fprintf(fp1,"REPLACE (Y/N)? ");
        while (!fgetse(rplce,3,fp1));
        if(toupper(*rplce) != 'Y')
        return (ALCON);
     }
     bin[5+type] = bin [5];
     bin[5+(type+1)%2]=cp->cparray[bin[2]][(type+1)%2];
     i=0;
     do{
        sendf(bin,SETXP,fp);              /* send 'connect' frame */
        writstat(cp,(result=getf(f)));
     }while (++i(*TRIES && result != TRUE);
     retryctr += i-1;
     if (result==TRUE){   /* return CONNECT or error code */
        if (xptc)
           eewrite(xptc,CPINIT);
        eewrite(&cp->cparray[*bin+2)][type],*(bin+5+type));
        return(CONNECT);}
     else
        return(result);
     } /* end of connect routine */

/*DISCN.C

Copyright 1985 by Reliance Electric

Convert ASCII string input to binary characters, assemble into 9-byte frame and send out.  Read return frame and return TRUE if successful or FALSE if
not successful.

02-06-85  PKM RRI    Return DISCONNECTED rather than TRUE
02-07-85  PKM RRI    Pass fp to getf and sendf
02-21-85  PKM RRI    add EE debugging code
02-27-85  PKM RRI    add EE map disconnect
04-12-85  PKM RRI    clean-up
06-04-85  PKM RRI    check for EEPROM initialized
06-07-85  PKM RRI    change write to cparray, add mdis
06-18-85  PKM RRI    allow only "to" or "from" parameter
06-24-85  PKM RRI    add EEPROM check
09-26-85  PKM RRI    add retries
10-07-85  PKM RRI    extra data byte in frame
*/ include <stdio.h>
include "eedef.h"
#include "cmdcodes.h"
#include "errcode.h"   /* error and success codes */
#include "semaphor.h"
```

```c
discn(ptr,fp,fp1,tofrom)
char *ptr[];
FILE *fp,*fp1;
int tofrom;
{
   return(dissub(ptr,fp,tofrom xpt));
} mdis(ptr,fp,tofrom)
char *ptr[];
FILE *fp;
int tofrom;
{
   return(dissub(ptr,fp,tofrom,mon));
} dissub(ptr,fp,tofrom,type)
char *ptr[],type;
int tofrom;
FILE *fp;
{
   extern int retryctr;
   char bin[7];
   int result, i;
   struct blklinks *node;
   struct codata *cp;

if (!checkee()) return(SYSNINIT);
   if (!ascbin(ptr[0],bin) || !ascbin(ptr[1],&bin[3]))
      return (SYNTAX);     /* convert 'to' and 'from' strings */
   if (tofrom == -1)   /* if only "from' parameter specified, guard */
      bin[2] = 0;      /* against erroneous SYNTAX error (if bin[5])31) */
   if (valdat(bin) == SYNTAX)
      return(SYNTAX);
   if ((node=findent((int)(*bin)*16 + (int)*(bin+1),*((int *)&LISTHEAD))) ==
NULL) /* su in EEPROM/ */
      return (SUNX); /* switch unit does not exist */
   cp=node+1;
   if (tofrom ==-1){ /* if only "from" */
      bin[2] = CPINIT;
      for (i=0; i<=31; i++){
         if(cp->cpqarray[i][type] == bin [5]){
            bin[2] = 1;
            break;
         }
      }
   }
   bin[5+type] = CPINIT;
   bin[5+(type+1)%2] = cp->cparray[bin[2]][(type+1)%2];
   i=0;
   do{
         sendf(bin,SETXP,fp);   /* send 'disconnect' frame */
         writstat(cp,(result=getf(fp)));
   }while (++i<*TRIES && result != TRUE);
   retryctr += i-1;
   if (result == TRUE){
      eewrite(&cp->cparray[*(bin+2)][type],CPINIT);
      return ,DISCON);}.
   else
      return(result);
} /* end of disconnect routine */
```

```
/* GETF.C

Copyright 1985 by Reliance Electric

Read return frame
If checksum is not valid, return FALSE.
Else if ACK, return TRUE.
    Else return false.

01-29-85    PKM RRI     add frame.h
01-29-85    DLF RRI     add debugging calls to hexs
01-29-85    DLF RRI     calls to read() and write() should not be in caps.
01-29-85    DLF RRI     stdio file changed to reflect project number
02-06-85    PKM RRI     add timeout code--if no char for .5 sec, timeout
                        add file pointer parameter
07-10-85    RYO RFP     deleted redundant EOF definition
10-04-85    PKM RRI     extra data byte in frame
*/ include <stdio.h>
include "frame.h"
#include "errcode.h"

getf(fp)
FILE *fp;
{
#ifdef DEBUG
   char buffer[40];
endif int cksum,i,getc(),byte;

ifdef D88
   extern char frame[];
   int c;

frame[COMMAND]=ACK;
   frame[DATA]=frame[DATA+1]=0;
   cksum=0;
   for (i=ADDRESS;i<CHECK; i++)
       cksum +=frame[i];
   frame[CHECK] = cksum)>8;
   frame[CHECK+1] = (char)cksum;
   c=getchar();
   switch(c){
       case 'N':
            frame[COMMAND]=NAK;
            break;
       case 'C':
            frame[CHECK+1] += 1;
            break;
       }
#else
       char frame[FRAMESIZ],susctr,chctr;

susctr=chctr=1;      /* initialize counters */
       for (i=START; i<=STOP;){
           byte=getc(fp);   /* get character */
           if (byte == EOF){
               tsksus(500);     /* if no character, suspend */
               byte=getc(fp);   /* get another character */
               if (byte == EOF || susctr++ == 6)
```

```
                    return(TIMEOUT);    /* TIMEOUT if still no */
                                        /* character or 6 suspend cycles */
            }
            if (i != START || (char)byte == STX){
                frame[i]=(char)byte;
                i++;
            }
            else{
                if (chctr++ == 50)  /* return TIMEOUT if 50 invalid */
                    return(TIMEOUT);    /* characters received */
            }
        }
endif ifdef DEBUG
    hexs(buffer,frame,9);
    fprintf(stderr,"RX FRAME:%s %c\n",buffer);
endif cksum=0;
    for (i=ADDRESS; i<CHECK; i++)
        cksum +=frame [i]; /* compute checksum */
    if (frame[CHECK] !=cksum))8 !! frame[CHECK+1] != (char)cksum)
        return(SWFAIL); /* compare cksum to that in frame */
                        /* FALSE = cksum not correct */
    if (frame[COMMAND] == ACK)  /* check for ACK */
        return(TRUE);   /* TRUE = ACK */
    else
        return(SWFAIL);
}
```

Dec 17 09:00 1985 sendf.c Page 1

```
/* SENDF.C

Copyright 1985 by Reliance Electric

Assemble and send 9-byte data frame.

01-29-85    PKM RRI    add frame.h
02-01-85    PKM RRI    coding error
01-29-85    DLF RRI    add debugging calls to hexs
01-29-85    DLF RRI    read() and write() calls should not be in caps.
01-29-85    DLF RRI    stdio file changed to reflect project number
02-06-85    PKM RRI    add file pointer parameter
02-07-85    DLF RRI    flush buffers
04-15-85    DLF RRI    flush buffers now done with ioctl(), include sotty.h
10-07-85    PKM RRI    extra data byte in frame
*/ include <stdio.h>
include <sgtty.h>
#include "frame.h"
#ifdef D88
char frame[FRAMESIZ];
endif sendf(cmdar,cmd,fp)
char *cmdar,cmd;
FILE *fp;
{
```

```
#ifdef DEBUG
  char buffer[40];
endif int addr, i, cksum;
ifndef D88
  char frame[FRAMESIZ];
  ioctl(fp,TIOCFLUSH,0);       /* i seek to beginning of device flushes buffer*/
#endif
  frame[START]=STX;    /* start byte */1
  addr=(*cmdar)*16 + *(cmdar+1); /* compute board address from b*16+s */
  frame[ADDRESS]=addr))8; /* move 2-byte address into frame--high byte */
  frame[ADDRESS+1]=(char)addr;     /* low byte */
  frame[COMMAND]=cmd; /* command */
  frame[DATA]=*(cmdar+2) + OFFSET;    /* offset crosspoints by 30H */
  frame[DATA+1]=*(cmdar+5) + OFFSET;
```
Dec 17 09:00 1985 sendf.c Page 2

```
  frame[DATA+2]=*(cmdar+6] + OFFSET;
  cksum=0;
  for (i=ADDRESS; i <CHECK; i++)
      cksum += frame [i]; /* compute checksum of bytes 1-5 */
  frame[CHECK]=cksum))8;   /* store 2-byte checksum in frame */
  frame[CHECK+1]=(char)cksum;
  frame (STOP]=ETX;    /* stop byte */
#ifnDef D88
  write(FP,frame,FRAMES12);   /* send frame */
#endif
ifdef DEBUG
  hexs(buffer,frame,FRAMESIZ);
  fprintf(stderr,"TX FRAME; %s",buffer);
endif } /* end of sendf */
```

What is claimed is:

1. A cross connect frame for digital signals transmitted at DS-1 and higher rates independent of signal format, said frame being capable of having connected thereto first and second groups of N digital transmission lines each, said frame comprising:
   (a) a first multiplicity of terminal means, said first group of N lines being individually connectable to selected ones of said first terminal means;
   (b) a second multiplicity of terminal means;
   (c) a third multiplicity of terminal means, said second group of N lines being individually connectable to selected ones of said third terminal means; and
   (d) removable circuit board means in electrical contact with said first and said second multiplicity of terminal means, said circuit board means including circuit means arrangeable to provide a connection between selected ones of said first and said second multiplicity of terminal means such that any one of said first group of lines can appear at any selected ones of said second multiplicity of terminal means,
   said second and said third multiplicity of terminal means being sufficient in number such that by connecting selected ones of said second terminal means to selected ones of said third terminal means any one of said first group of lines can be connected to any one of said second group of lines.

2. The cross connect frame of claim 1 wherein said circuit means included in said circuit board means is arranged to provide said connection by hardwiring means connected between said selected ones of said first and said second multiplicity of terminal means.

3. The cross connect frame of claim 1 wherein said circuit means included in said circuit board means is arranged to provide said connection by controllable switching means connected between said selected ones of said first and said second multiplicity of terminal means, said switching means responsive to a connect command signal to provide said connection, said circuit board means further including processing means for receiving a signal designating said connection and providing in response thereto said connect command signal.

4. The cross connect frame of claim 1 wherein said circuit means is arranged to provide a connection between all of said first and said second multiplicity of terminal means such that all of said first group of lines can appear at said second multiplicity of terminal means in any desired order.

5. The cross connect frame of claim 4 wherein said circuit means included in said circuit board means is arranged to provide said connection by hardwiring means connected between said first and said second multiplicity of terminal means.

6. The cross connect frame of claim 5 wherein said hardwiring means is arranged such that said first group of lines appears at said second multiplicity of terminal means in exactly the same order as they are connected to said first multiplicity of terminal means.

7. The cross connect frame of claim 3 wherein said controllable switching means is also arranged to provide a disconnection between selected ones of said first and said second multiplicity of terminal means, said switching means responsive to a disconnect command signal to provide said disconnection, said processing means also receiving a signal designating said disconnection and providing in response thereto said disconnect command signal.

8. A cross connect frame for digital signals transmitted at DS-1 and higher rates independent of signal format, said frame being capable of having connected thereto first and second groups of N digital transmission lines each, said frame comprising:
   (a) first means comprising:
      (i) a first group of terminal means, said first group of lines being connectable to said first group of terminal means;
      (ii) a second group of terminal means; and
      (iii) removable circuit board means in electrical contact with said first and said second group of terminal means, said circuit board means being arrangeable to provide a connection between said first and said second group of terminal means such that said first group of lines can appear at said second group of terminal means in any desired order; and
   (b) second means comprising:
      (i) a first group of terminal means to which said second group of lines are connectable; and
      (ii) a second group of terminal means which are connected to said first means second group of terminal means,
      said first and said second group of second means terminal means being sufficient in number to allow any one of said second group of lines to be connected to any one of said first group of lines.

9. The cross connect frame of claim 8 wherein said circuit board means is arranged to provide said connection by hardwiring means connected between said first and said second group of terminal means.

10. The cross connect frame of claim 8 wherein said circuit board means is arranged to provide said connection by controllable switching means connected between said first and said second group of terminal means, said switching means responsive to a connect command signal to provide said connection, said circuit board means further including processing means for receiving a signal designating said connection and providing in response thereto said connect command signal.

11. The cross connect frame of claim 9 wherein said hardwiring means is arranged such that said first group of lines appears at said second group of terminal means in exactly the same order as they are connected to said first group of terminal means.

12. The cross connect frame of claim 10 wherein said controllable switching means is also arranged to provide a disconnection between said first and said second group of terminal means, said switching means responsive to a disconnect command signal to provide said disconnection, said processing means also receiving a signal designating said disconnection and providing in response thereto said disconnect command signal.

13. A cross connect frame for digital signals transmitted at DS-1 and higher rates independent of signal format, said frame being capable of having connected thereto first and second groups of N digital transmission lines each, said frame comprising:
   (a) a chassis, said chassis having a first group of terminal means mounted thereon, said first group of lines being connectable to said first group of terminal means, said chassis also having a second group of terminal means mounted thereon;

(b) circuit board means inserted in said chassis in a removable manner, said board means comprising:
  (i) means for making electrical connection with said first and said second group of chassis mounted terminal means; and
  (ii) circuit means arrangeable to provide a connection between said first and said second group of chassis mounted terminal means such that said first group of lines can appear at said second group of chassis mounted terminal means in any desired order; and (c) cross connect means mounted on said chassis, said cross connect means comprising:
  (i) a first group of terminal means to which said second group of lines are connectable; and
  (ii) a second group of terminal means which are connected to said second group of chassis mounted terminal means,
    said first and said second group of cross connect terminal means being sufficient in number to allow any one of said second group of lines to be connected to any one of said first group of lines.

14. The cross connect frame of claim 13 wherein said circuit means is arranged to provide said connection by hardwiring means connected between said first and said second group of chassis mounted terminal means.

15. The cross connect frame of claim 13 wherein said circuit means is arranged to provide said connection by controllable switching means connected between said first and said second group of chassis mounted terminal means, said switching means responsive to a connect command signal to provide said connection, said circuit board means further comprising processing means for receiving a signal designating said connection and providing in response thereto said connect command signal.

16. The cross connect frame of claim 14 wherein said hardwiring means is arranged such that said first group of lines appears at said second group of chassis mounted terminal means in exactly the same order as they are connected to said first group of chassis mounted terminal means.

17. The cross connect frame of claim 15 wherein said controllable switching means is also arranged to provide a disconnection between said first and said second group of chassis mounted terminal means, said switching means responsive to a disconnect command signal to provide said disconnection, said processing means also receiving a signal designating said disconnection and providing in response thereto said disconnect command signal.

18. A cross connect frame for digital signals transmitted at DS-1 and higher rates independent of signal format, said frame being capable of having connected thereto first and second groups of N digital transmission lines each, said frame comprising:
  (a) a chassis;
  (b) board means inserted in said chassis in a removeable manner, said means comprising:
    (i) a first group of terminal means, said first group of lines being connectable to said first group of terminal means;
    (ii) a second group of terminal means, and
    (iii) circuit means arrangeable to provide a connection between said first and said second group of terminal means such that said first group of lines can appear at said second group of terminal means in any desired order; and
  (c) cross connect means mounted on said chassis, said cross-connect means comprising:
    (i) a first group of terminal means to which said second group of lines are connectable; and
    (ii) a second group of terminal means which are connected to said board means second group of terminal means,
      said first and said second group of cross-connect terminal means being sufficient in number to allow any one of said second group of lines to be connected to any one of said first group of lines.

19. The cross connect frame of claim 18 wherein said circuit means included in said board means is arranged to provide said connection by hardwiring means connected between said first and said second group of board means terminal means.

20. The cross connect frame of claim 18 wherein said circuit means included in said board means is arranged to provide said connection by controllable switching means connected between said first and said second group of board means terminal means, said switching means responsive to a connect command signal to provide said connection, said board means further comprising processing means for receiving a signal designating said connection and providing in response thereto said connect command signal.

21. The cross connect frame of claim 19 wherein said hardwiring means is arranged such that said first group of lines appears at said second group of board means terminal means in exactly the same order as they are connected to said first group of board means terminal means.

22. The cross connect frame of claim 20 wherein said controllable switching means is also arranged to provide a disconnection between said first and said second group of board means terminal means, said switching means responsive to a disconnect command signal to provide said disconnection, said processing means also receiving a signal designating said disconnection and providing in response thereto said disconnect command signal.

23. A cross connect frame for digital signals transmitted at DS-1 and higher rates independent of signal format, said frame being capable of having connected thereto first and second groups of N digital transmission lines each, said frame comprising:
  (a) electronically controllable switching means which responds to a command signal by connecting or disconnecting selected lines of said first group with or from selected lines of said second group, said first and said second groups of lines being connectable to said switching means; and
  (b) electronic control means connected to said electronically controllable switching means, said control means comprising:
    (i) interface means having input means for receiving a signal designating said selected lines of said first and said second group of lines to be connected or disconnected and a command indicating connection or disconnection and also having output means for transmitting said command signal to said switching means; and (ii) processing means connected to said interface means for receiving therefrom said designating signal, said processing means providing in response thereto said command signal.

24. The frame of claim 23 wherein said switching means has first and second groups of terminal means, said first group of lines being connectable to said first group of terminal means, and said frame further comprising a third group of terminal means, said second group of lines being connectable to said third group of terminal means, said third group of terminal means being electrically connectable to said second group of terminal means to allow said second group of lines to appear at second group of terminal means in any desired order.

25. The frame of claim 23 further comprising a chassis and board means inserted in said chassis in a removable manner, said electronically controllable switching means and said electronic control means being located on said board means.

26. The frame of claim 25 wherein said chassis includes first and second groups of terminal means mounted thereon, said first group of lines being connectable to said first terminal means, said board means having means for making electrical connection with said first and said second group of chassis mounted terminal means to thereby connect said switching means to said first and said second group of terminal means, said chassis further including a third group of terminal means mounted thereon, said second group of lines being connectable to said third group of terminal means, said third group of terminal means being electrically connectable to said second group of terminal means to allow said second group of lines to appear at second group of terminal means in any desired order.

* * * * *